US007446644B2

(12) United States Patent
Schaffzin et al.

(10) Patent No.: US 7,446,644 B2
(45) Date of Patent: Nov. 4, 2008

(54) UNIVERSAL HANDS FREE KEY AND LOCK SYSTEM

(75) Inventors: Richard A. Schaffzin, Mountain View, CA (US); David A. Candee, Milpitas, CA (US); John A. Massa, Pflugerville, TX (US); Jeffrey D. Schaffzin, Mountain View, CA (US); Jay K. Gall, Saratoga, CA (US); Robert J. Hill, Prunedale, CA (US)

(73) Assignee: SecureAll Corporation, Mountain View, CA (US)

( * ) Notice: Subject to any disclaimer, the term of this patent is extended or adjusted under 35 U.S.C. 154(b) by 502 days.

(21) Appl. No.: 11/035,636

(22) Filed: Jan. 14, 2005

(65) Prior Publication Data

US 2006/0164208 A1 Jul. 27, 2006

(51) Int. Cl.
*G05B 19/00* (2006.01)
*B60R 25/00* (2006.01)
*G08B 21/00* (2006.01)

(52) U.S. Cl. .................. 340/5.6; 340/5.64; 340/5.7; 340/686.2

(58) Field of Classification Search ............. 340/5.64, 340/5.7, 686.2, 5.6
See application file for complete search history.

(56) References Cited

U.S. PATENT DOCUMENTS

| 4,936,316 | A | * | 6/1990 | Jewett ..................... 600/588 |
| 5,473,318 | A | * | 12/1995 | Martel ..................... 340/5.23 |
| 5,602,535 | A | | 2/1997 | Boyles et al. |
| 5,719,564 | A | * | 2/1998 | Sears ..................... 340/870.02 |
| 6,002,332 | A | * | 12/1999 | King ..................... 340/545.1 |
| 6,008,727 | A | | 12/1999 | Want |
| 6,064,309 | A | * | 5/2000 | Sellers et al. ............. 340/573.6 |
| 6,097,301 | A | * | 8/2000 | Tuttle ..................... 340/693.9 |

(Continued)

OTHER PUBLICATIONS

Fischetti, M. "Keyless Entry," *Scientific American*, 3 pages, (Jan. 2005).

(Continued)

*Primary Examiner*—Brian Zimmerman
*Assistant Examiner*—Yong Hang Jiang
(74) *Attorney, Agent, or Firm*—Alan H. MacPherson; MacPherson Kwok Chen & Heid LLP

(57) ABSTRACT

Methods and systems are provided for a universal key that enables a user to have access to any type of secured portal, both physical and electronic, in a wireless, hands-free, distance-independent manner without requiring contact or line of sight access between the key and the secured portal. The universal key is not distance-dependent, and each secured portal can be provided with its own prescribed activation range, if desired. Some portals may be provided with long range activation, such as 50 feet, while other portals may be provided with short range activation of a few feet or less. The type of portal being secured and the range of activation may be selected by the user and is not limited by the universal key. In addition, the universal key will provide access to the secured portals in a hands-free fashion so that the user need not push any buttons or take any other action in order to obtain access to the portal. The user need only carry the universal key somewhere on their person in order to access the portal.

59 Claims, 17 Drawing Sheets

U.S. PATENT DOCUMENTS

| | | | |
|---|---|---|---|
| 6,107,934 A * | 8/2000 | Andreou et al. | 340/5.71 |
| 6,111,977 A * | 8/2000 | Scott et al. | 382/124 |
| 6,219,439 B1 | 4/2001 | Burger | |
| 6,236,335 B1 * | 5/2001 | Goodwin, III | 340/825.49 |
| 6,570,487 B1 * | 5/2003 | Steeves | 340/5.2 |
| 6,690,259 B2 * | 2/2004 | Aslanidis et al. | 340/5.61 |
| 6,888,459 B2 * | 5/2005 | Stilp | 340/541 |
| 2003/0097586 A1 | 5/2003 | Mok | |
| 2006/0018139 A1 | 8/2006 | McNeil et al. | |
| 2007/0001816 A1 | 1/2007 | Lindley et al. | |

OTHER PUBLICATIONS

International Preliminary Report on Patentability, PCT/US05/044250, mailing date Sep. 27, 2007.

Written Opinion of the International Searching Authority, PCT/US05/044250, date of mailing Aug. 24, 2007.

International Preliminary Report on Patentability, PCT/US05/044250, mailing date Nov. 14, 2007.

Written Opinion of the International Searching Authority, PCT/US05/044250, mailing date Nov. 14, 2007.

* cited by examiner

UNIVERSAL HANDS FREE KEY AND LOCK SYSTEM

FIELD OF THE INVENTION

This invention relates to an access control system and in particular to an access control system in which multiple locks may be programmed to accept the same universal key, so that the possessor of the universal key is able to open the locks using a single key.

BACKGROUND OF THE INVENTION

Most people carry numerous keys to allow them to open doors to their automobile, house, office, garage and vacation home. New keys are constantly being added into this collection as new locks are put into service and old keys are replaced when locks are changed. As a result, most key rings are bulky and heavy from their large number of keys. Often, finding the right key to open a lock is not an easy task, especially if the lock is located in a poorly lit area. Moreover, when a person is using both arms to carry a load, setting down at least part of the load to free a hand to find the right key to unlock a door is both time consuming and difficult.

Accordingly, a need exists for a simplified key and lock system which makes it possible for a user to easily open any lock without having to carry separate keys for different locks and which allows the user to open any lock hands free (i.e., without having to touch a key or equivalent).

SUMMARY OF THE INVENTION

In accordance with this invention, methods and systems are provided for a universal key that enables a user to have access to any type of secured portal, both physical and electronic, in a wireless, hands-free, distance-independent manner without requiring contact or line of sight access between the key and the secured portal. The universal key is not distance-dependent, and each secured portal can be provided with its own prescribed activation range, if desired. Some portals may be provided with long range activation, such as 50 feet, while other portals may be provided with short range activation of a few feet or less. The type of portal being secured and the range of activation may be selected by the user and is not limited by the universal key. In addition, the universal key will provide access to the secured portals in a hands-free fashion so that the user need not push any buttons or take any other action in order to obtain access to the portal. The user need only carry the universal key somewhere on their person in order to access the portal.

In accordance with this invention, methods and systems are provided which allow a single universal key system to be used to open a plurality of different locks. A hands-free, universal key that wirelessly and omnidirectionally transmits an ID code to open a plurality of different locks is provided. This single universal key can replace the large number of different keys that a person typically carries, including mechanical tumbler-type keys, mag cards, automobile "keyless entry" transmitters, garage door openers, and the like. Because the system allows hands free opening of locks, the system allows the user to quickly and easily pass through otherwise locked doors without setting down loads or searching through pockets or purses for keys.

In accordance with an embodiment of the present invention, a universal key carried on a user transmits wirelessly (e.g., an RF signal) a unique code to a reader coupled to a mechanism to activate a lock. Each lock to be activated by the universal key is equipped with a reader which receives the code sent by the universal key. When the unique code transmitted by the universal key ("ID code") matches a corresponding code in the reader, the reader recognizes the code and opens the lock.

In one embodiment, the reader is sensitive to its distance from the universal key. For example, for a garage door, the reader is capable of detecting the transmitted signal when the universal key is a selected distance (e.g., 100 feet), from the lock associated with the garage door. Accordingly, the reader will detect the transmitted signal when the universal key comes within the selected distance of and traveling in a direction towards the reader. The reader will then cause an actuator to unlock the garage door, opening the garage door in response to recognizing the code carried by the RF signal. On the other hand, the reader associated with the lock on a door to a house will not recognize the code on the RF signal unless the universal key is much closer to the door. For example, such distance could be three (3) feet or less from the reader associated with the lock on the door. The reader associated with the door lock would then detect and recognize the transmitted code and cause the door to unlock.

In another embodiment of the invention, the reader in the lock is sensitive to the direction from which the code is transmitted by the universal key, so that the code will only be detected by the reader associated with the lock in the door when the user carrying the universal key is outside the door but not when the user is inside the door. This prevents the door from being inadvertently unlocked when the user carrying the universal key passes close to the inside of the door. In addition, the lock may be configured to automatically unlock when the door is approached from the outside and will automatically lock when the user walks away from the door on the outside and travels beyond the receiver read range.

In one embodiment, the reader associated with a lock can be programmed to recognize a number of different ID codes, thereby allowing different people to open the lock. In one embodiment, the system is capable of recognizing 10 billion unique ID codes. The reader can also be programmed to not allow the lock to be opened unless multiple ID codes are received simultaneously (i.e., two or more universal keys are in proximity of the receiver at the same time). This gives an enhanced security option should it be required by the user.

In another embodiment of the invention, the reader is located in an automobile and thereby allows the user to open the driver's door when the universal key carried by the user comes within a selected distance of the driver's door. A typical distance would be five (5) to ten (10) feet, although other distances can also be selected if desired. Again, the reader is sensitive to the transmitted ID code only when the universal key carried by a user is within the selected distance from the reader associated with the lock. As with the door application above, the reader associated with the driver side door may be configured such that the ID code is not received or is disregarded when the driver carrying the universal key is located inside the vehicle. The doors may be programmed to be automatically locked when the gearshift is put in drive with the motor running. The universal key may continue to communicate with readers outside the car, such as a reader associated with a garage door opener. When the driver exits the car, the reader associated with the driver side door starts to pick up the signal from the universal key and when the universal key gets beyond read range, the car door will automatically lock.

In another embodiment, a warning system is provided in the door lock, the universal key, or both. The warning system notifies the user that the battery powering the respective circuitry is getting low, thereby prompting the user to replace the battery before the battery fails. The universal key may also have a small supplemental battery for sounding an alarm when the primary battery should be replaced.

In accordance with one embodiment of this invention, should the battery fail, an ordinary key can be used to open the door. In one embodiment, a key can also be used to unlock the door even while the battery is adequate to power the motor associated with the lock, but the universal key eliminates the need to carry an extra key for general usage.

The advantages that may be achieved by various embodiments of the invention are numerous. For example, the user does not have to carry a collection of electronic or traditional keys, to remember numerous passwords or personal identification numbers (PINs), or to remember which opens which lock. These systems may save time by allowing the user to open a lock hands free as the user approaches the lock, rather than waiting until the user has reached the lock. It is also unnecessary for the user to set down parcels, reach into his or her pocket or pocketbook, remove the key ring, find the right key, insert the key in the lock and finally unlock the door. Instead, the user is able to automatically unlock the lock as the user comes within the range in which the lock is capable of receiving the ID code from the universal key. It is not necessary to put down groceries, a baby, or anything else the user may be carrying. When the door is pushed completely closed from the inside (a sensor in the locking mechanism assures the door is fully shut), the system automatically locks the door without requiring any further action by the user.

In addition, the system in one embodiment provides an automatic, retrievable record of each lock opening by date and time. When a lock is capable of being opened by a number of people, the invention allows the owner or proprietor of the lock to keep a record of the users of the lock and of the time of each use. It is also possible to program each lock so entry is allowed only during certain hours of the day or week.

This invention will be more fully understood in conjunction with the following detailed description taken together with the drawings.

DETAILED DESCRIPTION

Figure 1A:
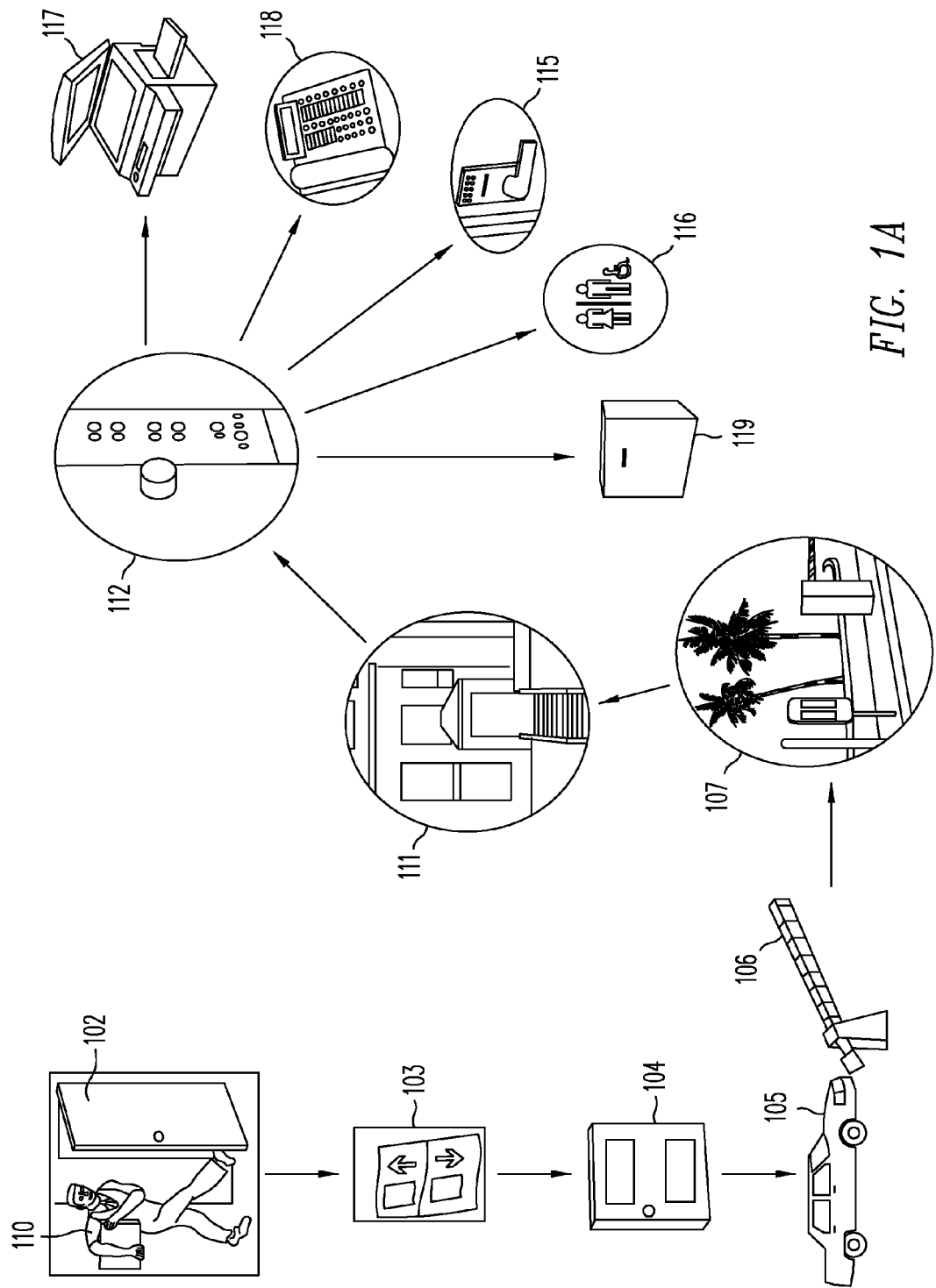
FIG. 1A shows how a universal key, in accordance with one embodiment of this invention, allows a user to more easily enter secured facilities and equipment during a typical day.

This description is illustrative of the embodiments of the present invention only and not intended to be limiting. For example, in this detailed description, a universal key is described which includes a radio frequency (RF) signal transmitter for transmitting a unique ID code that modulates an RF carrier signal. The present invention is not limited, however, by the form of wireless signal transmission or any particular communication protocol between the transmitter and the receiver of the ID code. To simplify discussion and to allow comparison between figures, like elements are assigned like reference numerals.

FIG. 1A shows the path of a person using the universal key in accordance with one embodiment of the present invention from the time the person leaves home until the person has completed a substantial part of the workday. As shown in FIG. 1A, the user 110 leaves an apartment in an apartment building through door 102. In one embodiment, the lock on door 102 does not allow the universal key to open the lock from inside the apartment, so the user opens the door manually, walks outside, and pulls the door shut. Upon exit, the reader in the door lock picks up the ID code transmitted by the universal key. The door lock remains open until the user travels beyond the read range of the locking system. At that point, the door 102 automatically locks.

The universal key may be configured to communicate with an elevator 103 to provide hands-free service to a user 110. For example, an elevator control system may detect the universal key as the user approaches the elevator shaft and will automatically summon the elevator to the floor where the user is located, without requiring the user to press a call button. The elevator control system may also access a storage device that stores one or more of the user's preferred floors (or floors he is allowed to access). Thus, when the user boards the elevator on the user's residence level, the elevator may take the user to the garage floor where the user's reserved parking slot is located (or to the garage level where the user was last detected). Similarly, when the individual returns to the apartment building later and boards the elevator on a garage level, the elevator may automatically proceed to the individual's residence level (and also record the garage level where the user boarded the elevator). The automatic floor select may also be overridden by the user.

Once on the garage level, user 110 may enter the garage through another door 104 unlocked by the universal key. Car 105 may also include a lock unit configured to receive the transmitted code from the universal key. If the ID coded signal from the universal key is recognized by the reader in the car 105 as the individual approaches the car 105, the car door is automatically unlocked. The automobile may further be configured to allow a recognized user to start the car by pressing a button without requiring the user to insert a mechanical key to effectuate ignition. User 110 then leaves the garage, opening gate 106 automatically with the ID code from the universal key.

User 110 then drives to work and enters his work place through gate 107, again opened by the ID code transmitted from the hands-free universal key. In similar fashion, the individual can use the universal key to access a number of secured locations, such as a campus gate and another garage. Leaving his car, user 110 then walks from the garage with the hands-free universal key on his person, thereby freeing the user's hands to carry other items.

As the user approaches lobby 111, the lobby door automatically unlocks in response to the ID code transmitted from the universal key. In one embodiment, in which the locked door includes a powered opening mechanism, the presence of the universal key may both unlock the door and cause the door to swing open for the user. Similar to elevator 103 in the apartment building, an elevator 112 at the end of the lobby then opens its door in response to the ID code from the universal key. Next, the door on the floor where user 110 departs the elevator 112 automatically opens in response to the ID code from the universal key. The user then approaches the user's office and the door to the office unlocks automatically in response to the ID code transmitted from the universal key.

The universal key can also be used to grant access to any locations, devices, or services which the user wishes to access during his or her work day (e.g., locks on a closet 115 or storage area 119 associated with the user's office, or to a secured restroom 116). These locks may include mechanical or electronic kinds (e.g., those protected by a password or a personal identification number (PIN)). The universal key may also be used to grant access to any piece of office equipment that requires an authorization, authentication or tracking code (e.g., fax machine, copier 117, voicemail retrieval or long distance calls from a telephone system 118, and personal computer access).

Figure 1B:
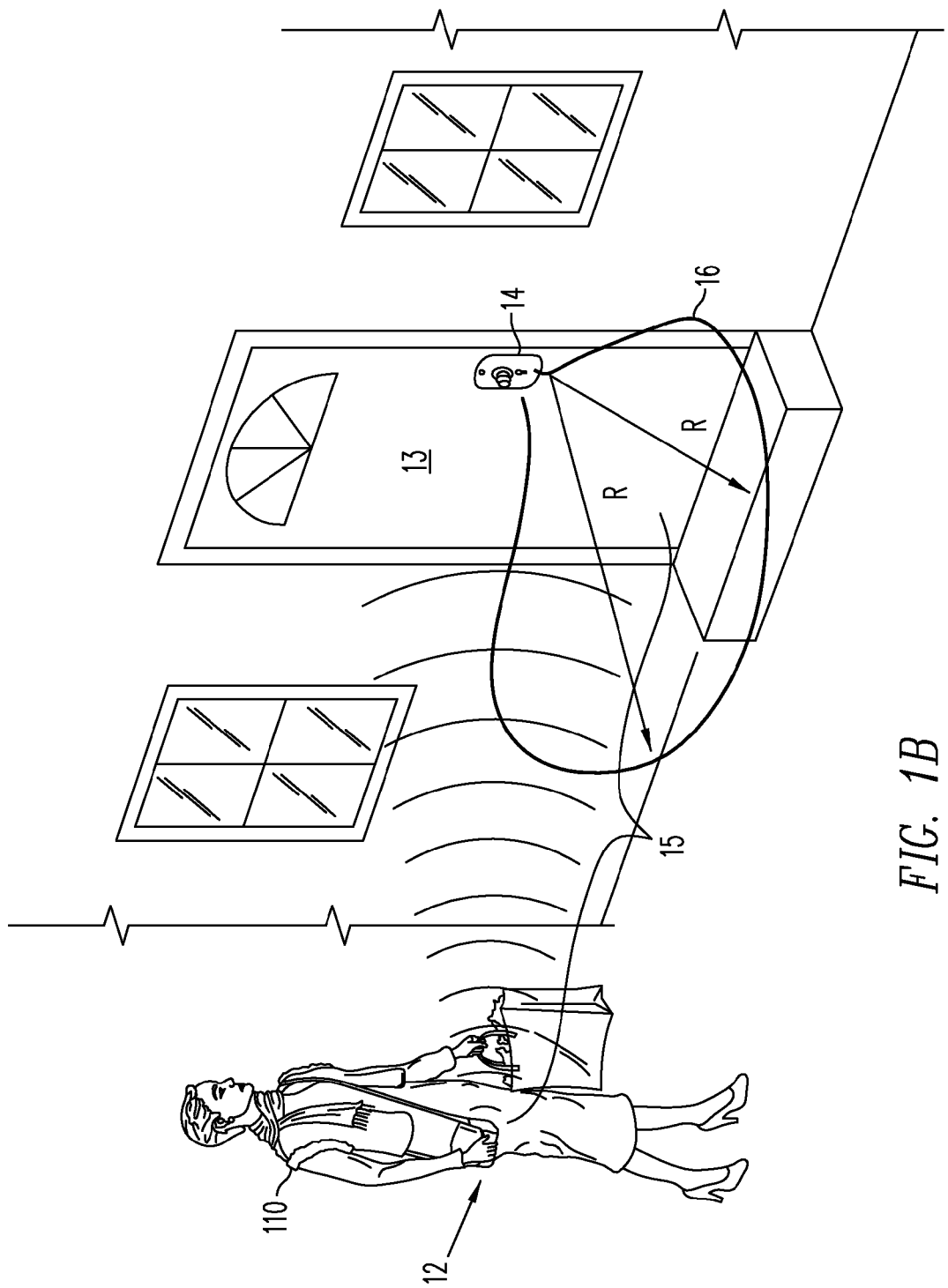
FIG. 1B shows a user carrying a universal key in accordance with one embodiment of this invention approaching a door containing a lock receptive to an ID code from the universal key.

FIG. 1B shows a user 110 approaching on foot the door 13 of her house. User 110 has in her purse a universal key 12 which is repeatedly transmitting an ID code to the reader in lock unit 14. In other embodiments, the reader may be provided with a transceiver which transmits an interrogation signal to the universal key 12. When the universal key 12 enters the range of the interrogation signal, the universal key 12 will transmit the ID code in response to the interrogation signal. The universal key 12 transmits an ID code 15 (either encrypted or unencrypted) to the reader in lock unit 14 contained in and controlling the unlocking of door 13. The reader in lock unit 14 (an example of which is described below with reference to FIG. 2) is capable of picking up the ID code from universal key 12 only when universal key 12 comes within the prescribed distance R from lock unit 14. Distance R associated with the front door is typically two (2) to three (3) feet, although other distances even as small as a few inches can be selected, if desired. The short distance R between the reader in lock unit 14 and the universal key 12 within which the reader would detect and respond to the signal from universal key 12 is designed to prevent door 13 from unlocking before user 110 comes close enough to door 13. A prematurely unlocked door may allow unauthorized access to the secured premise through the unlocked door 13.

As shown in FIG. 1B, the reader associated with lock unit 14 receives the ID code from universal key 12 on the person of user 110 outside door 13. Typically, as will be described below, lock unit 14 is directional and only unlocks the door in response to receiving an ID code signal transmitted by universal key 12 from outside the house. As a result, when user 110 is inside the house, door 13 will not unlock even when user 110 is within the prescribed distance from door 13. This arrangement prevents door 13 from being unlocked inadvertently as user 110 moves around the house. This directional recognition can be accomplished in a variety of ways, as will be described in greater detail below. In one embodiment, the antenna of lock unit 14 is only capable of receiving signals generated on one side of door 13. In another embodiment, lock unit 14 is configured to identify the general location of the universal key (e.g., in front of the door or behind the door) and will only unlock the door in response to an ID code received from the desired direction or location (e.g., in front of the door).

Figure 2:
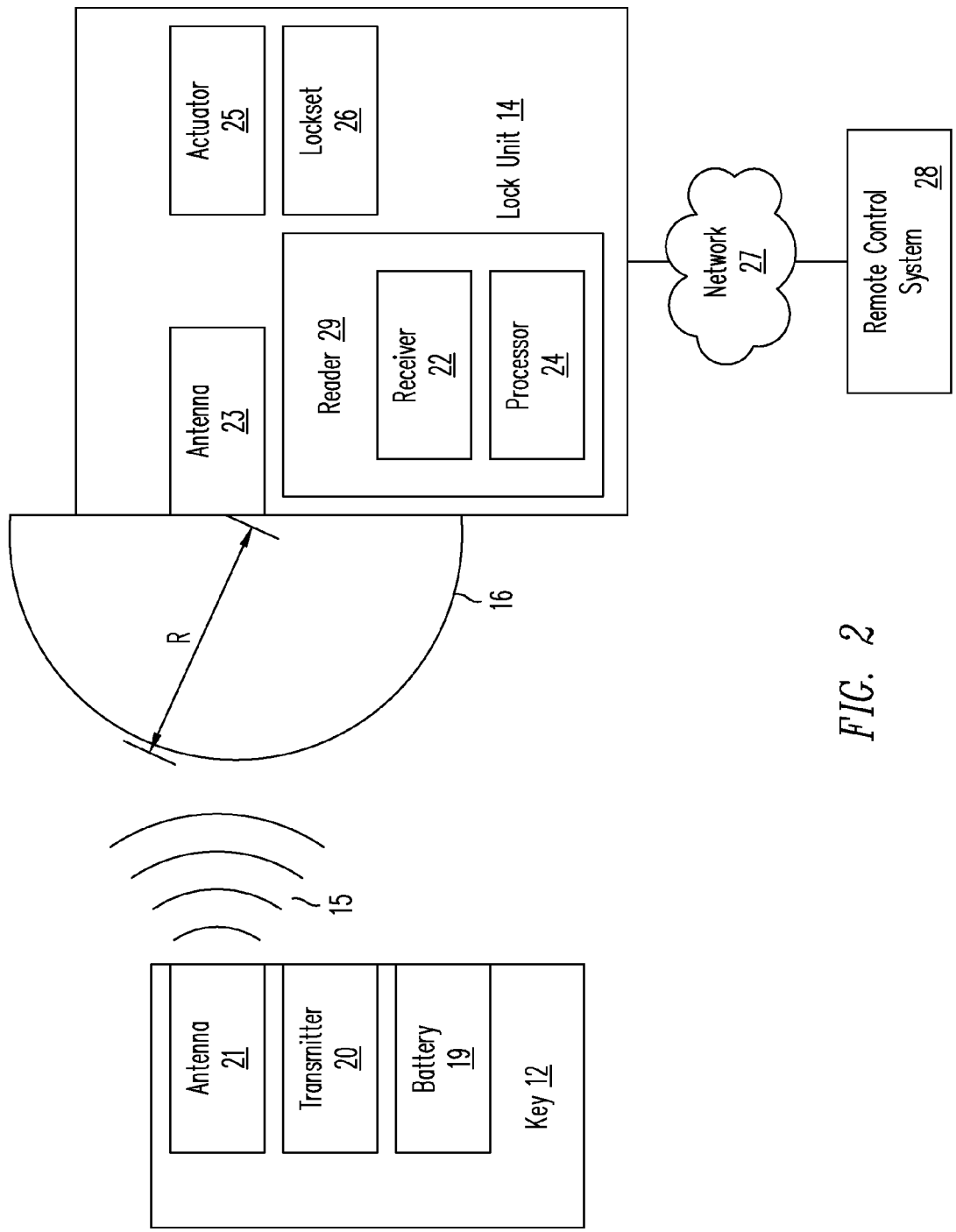
FIG. 2 shows the relationship of a universal key, the ID code from the universal key, a lock unit, and a remote control system, in accordance with this invention.

FIG. 2 is a block diagram showing a universal key 12 and a lock unit 14, in accordance with one embodiment of the present invention. Universal key 12 comprises an antenna 21, a transmitter 20, and a battery 19. Lock unit 14 comprises an antenna 23, a reader 29, a lockset actuator 25, and a lockset 26. Reader 29 comprises a receiver 22 and a processor 24. Lock unit 14 may be powered by a variety of mechanisms, e.g., a battery or rectified A/C power supply.

FIG. 2 shows that the universal key 12 includes antenna 21 and transmitter 20 for transmitting an ID coded signal 15, which is received by antenna 23 in lock unit 14. As illustrated by the pattern 16, antenna 23 and receiver 22 in lock unit 14 are capable of detecting the signal 15 transmitted from universal key 12 only when universal key 12 is within the area contained within the line 16. Lock unit 14, thus, has a directionally-sensitive and range-limited reader 29 that will prevent lock unit 14 from responding to ID coded signal 15 when the universal key 12 is located outside of the area bounded by line 16. A remote control system 28 coupled to lock unit 14 via network connection 27 may be provided to allow monitoring and remote programming of lock unit 14 (e.g., to allow access by certain ID codes) or to query the access records of lock unit 14.

Figure 3:
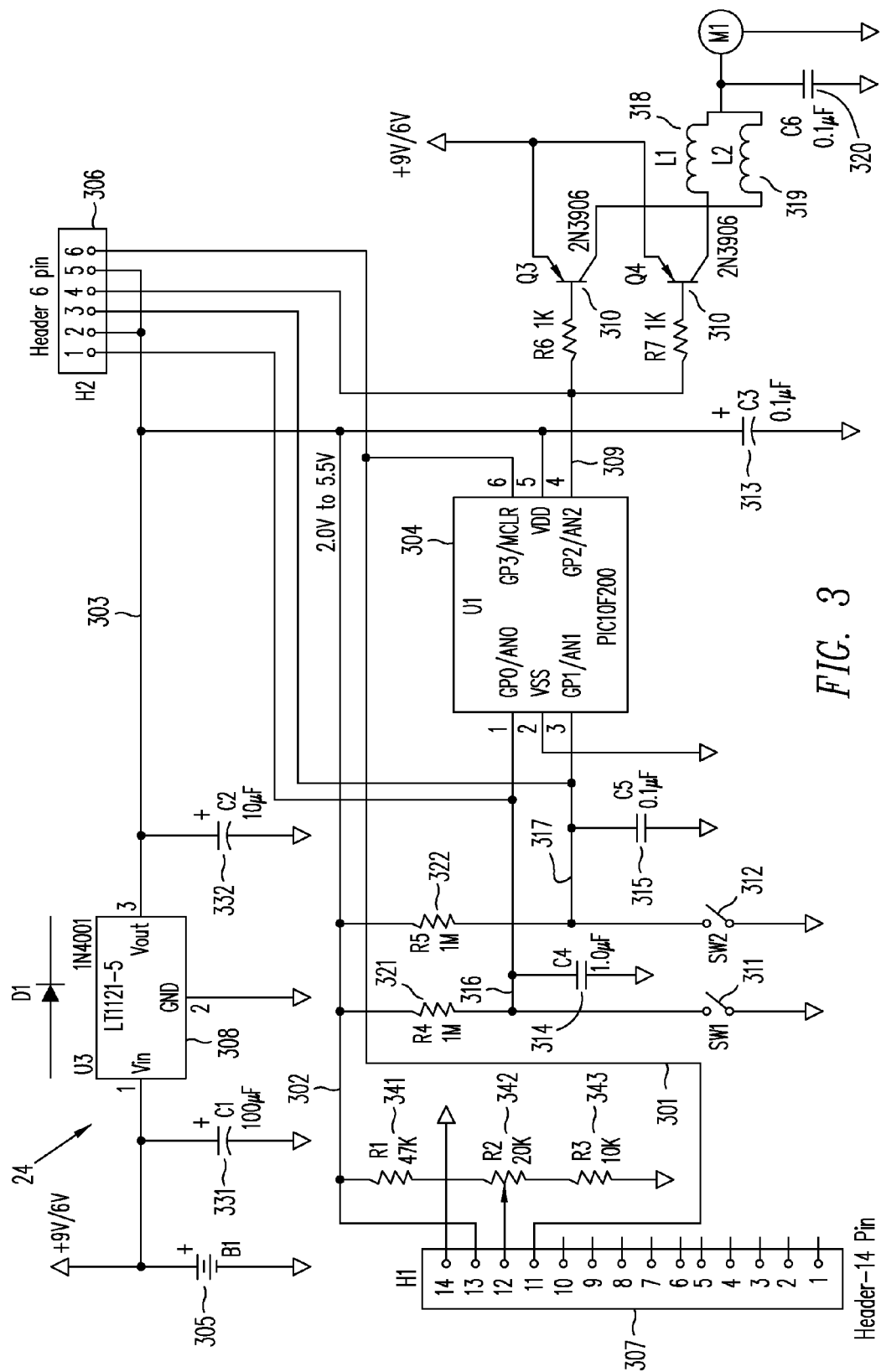
FIG. 3 shows the circuit diagram of a door reader capable of processing an ID code received from a universal key by a receiver and then sent to the processor to drive a motor that activates a lock.

FIG. 3 shows the circuit diagram of processor 24 of lock unit 14 capable of processing an ID code received from universal key 12. The wireless signal containing the ID code is received by antenna 23 and receiver 22, and is sent to the processor 24 to drive a motor that activates a lock. FIG. 3 shows a schematic diagram associated with microcontroller 304 in the lock unit 14 for reading and processing ID coded signal 15 received from universal key 12 (FIG. 2), in accordance with one embodiment of the present invention. A connector 307 is provided for coupling processor 24 to receiver 22, as will be described in greater detail below.

A power source represented by battery 305 (e.g., a 6-9 volts battery) in FIG. 3 powers the circuits (e.g., microcontroller 304) located in lock unit 14 in door 13 (FIG. 1B). Voltage regulator 308, a DC to DC converter, comprises a three-terminal voltage regulator which provides a steady power supply voltage between 2.0 to 5.5 volts at terminal 303; this power supply voltage is also provided to other circuits through pins 2 and 5 of connector 306. Alternatively, if the desired voltage is 6 volts[1], a diode (e.g., a 1N914 or a 1N4001 diode) rather than a voltage regulator, may be used to produce a 0.7 voltage drop and a resulting 5.3 volts at terminal 302. A filter capacitor 313 is provided at terminal 303 to filter out noise. Additional filter capacitors 331 and 332 (100 microfarad and 10 microfarad, respectively, in one embodiment) are also provided on either side of voltage regular 308.

[1] Use of a six (6) volt battery is typically not preferred because the life of a six (6) volt battery is shorter than the life of a nine (9) volt battery using similar cells. However, six (6) volt batteries may be required for certain door sizes and, thus, this embodiment of the invention is capable of operating with either voltage level battery. In another embodiment, a different power source may be used.

A variable resistance (shown in FIG. 3 as including a potentiometer 342 and two fixed resistors 341, 343) is used to select a desired voltage level. Receiver 22 (one example of which is shown in detail in FIG. 9) detects an RF signal from the universal key 12 (to be described later in conjunction with FIG. 4). The RF signal carries an ID code. In accordance with one embodiment, the RF signal may be an ASK (amplitude-shift-keying) encoded signal. In some embodiments, the ID code may also be encrypted. Receiver 22 can also be implemented by any suitable RF receiver configured to receive the desired signal frequency (e.g., RF receiver rfRXD0920, available from Microchip Technology Inc., in Chandler, Ariz.). Receiver 22 transmits the ID code on pin 11 (terminal 301) of connector 307, in a manner to be described below. In the case where the RF signal is ASK-coded, the power supply voltage level may be adjusted via potentiometer 342 to provide a threshold for detecting the received ASK signal Microcontroller 304 (e.g., flash microcontroller PIC10F200, available from Microchip Technology, Inc.) receives the ID code on terminal 301 and determines if the ID code matches one of the authorized stored codes. Should a match be found, a signal is sent on terminal 309 from microcontroller 304 to turn on an actuator circuit. The actuator circuit includes transistors 310, which drive actuator 25 (shown in FIG. 3 as motor M1) to open the lockset 26 on lock unit 14. A filter circuit including inductors 318 and 319 and capacitor 320 is provided to filter out noise fed back from motor M1. Under certain conditions (e.g., exceptional conditions), the actuator circuit can also be turned on and reset by closing switches 311 and 312, respectively. Microcontroller 304 may be selected according to the features required by the locking system.

In accordance with the illustrated embodiment, switches 311 and 312 are used to control the locking and unlocking of the lockset 26 using motor M1. In particular, switches 311 and 312 are used to control the duration of activation of motor M1 in response to receiving an authorized ID code. Motor M1 rotates in only one direction and is connected to a rotatable cam, which is connected to lockset 26, e.g., a deadbolt lockset. When motor M1 rotates the cam through a certain angle, the latch of the deadbolt is retracted from the strike plate and the door 13 is capable of being opened. If motor M1 continues to rotate the cam, the cam to which lockset 26 is connected then causes the latch of deadbolt to be pushed back into the strike plate until the latch is fully inserted. At this time, the motor M1 again stops. The mechanical cam system is thus like a locomotive drive in that the rotation of the cam in one direction causes a back and forth linear motion of the latch in the lock to which the cam is connected. In another embodiment, motor M1 is controlled to turn and open the lock in one direction and to turn in the opposite direction to subsequently close the lock.

Switch 311 monitors whether lockset 26 is locked or unlocked. Switches 311 and 312 are normally open. Input terminals 316 and 317 to microcontroller 304 are typically pulled by pull-up resistors 321, 322 to the voltage level of power rail 302. Capacitors 314 and 315 filter out the RF and motor noise associated with the system and motor M1. When lockset 26 is unlocked, terminal 316 receives a "0" signal, and when lockset 26 is locked, terminal 316 receives a "1" signal. Switch 312 is a trigger switch that normally causes terminal 317 to receive a "1" signal, but will briefly pulse to a "0" signal when lockset 26 is either fully locked or fully unlocked.

When microprocessor 304 detects an ID code transmission on terminal 301, microprocessor 304 waits for a short period of time (e.g., 30 milliseconds) for the transmission to complete, and then waits for the ID code transmission to repeat. This delay helps to ensure that microprocessor 304 receives the complete ID code transmission. Each ID code may include a header portion to indicate the start of the ID code, in order to assist microprocessor 304 in synchronizing with the received signal. After a complete ID code is received, microprocessor 304 determines whether the received ID matches one of the ID codes authorized to unlock lock unit 14. If the ID code matches, then microprocessor 304 transmits a signal along terminal 309 to activate motor M1, thereby unlocking lockset 26. When a "0" pulse is detected on terminal 317 (indicating that lockset 26 is either fully locked or fully unlocked), microprocessor 304 checks the signal on terminal 316. If the signal on terminal 316 is "0", this indicates that lockset 26 is fully locked, so microprocessor 304 continues activation of motor M1 until the terminal 317 detects another "0" pulse and the signal on terminal 316 is "1". This indicates that lockset 26 is fully unlocked, so motor M1 is stopped.

After lockset 26 is fully unlocked, microprocessor 304 will initiate a "KeepOpen" routine to maintain lockset 26 in the unlocked position for as long as the authorized ID code continues to be detected on terminal 301. When user 110 has traveled beyond the range of reader 29, such as when user 110 has gone through door 13 into the house, the ID code is no longer received. Once a prescribed period of time (e.g., one second) has passed during which the ID code is not detected on terminal 301, microprocessor 304 will initiate a "Lock" routine to relock lockset 26. A signal is transmitted on terminal 309 activating motor M1. Terminal 317 is monitored for a "0" pulse, again indicating that lockset 26 is either fully locked or fully unlocked. When the "0" pulse is received, the signal on terminal 316 indicates whether lockset 26 is locked or unlocked. Once the "0" pulse on terminal 317 is received simultaneously with receiving a "0" signal on terminal 316, motor M1 is stopped and microprocessor 304 begins awaiting the next ID coded signal.

To detect if door 13 is open, an additional switch (e.g., a mechanical detent) can be used with lock unit 14 to inform processor 24 whether door 13 is open or shut. In one embodiment, a switch will be used in series with the motor so that if door 13 is not closed, motor M1 will not move. This switch is a safety precaution to ensure that door 13 must be completely shut before the deadbolt in lock unit 14 will automatically enter the strike plate.

In other embodiments, switches SW1 and SW2 may operate in a variety of ways, depending on the type of lockset that is used in lock unit 14. The system however is flexible so no matter which lockset is used in lock unit 14, microprocessor 304 can be programmed to let switches SW1 and SW2 inform the microprocessor 304 of the status of the door (i.e. when the door is open or closed).

As an optional embodiment, when battery B1 runs low, a warning light or other type of signal (for example, a brief beeping sound on a periodic or an aperiodic basis or a blinking light when a transmitted coded signal is received) can be activated in the lock unit 14 to warn user 110 to replace the battery so that the door can continue to be opened and closed using universal key 12. An LED can also be used as a warning light but the LED will draw current and thus further decrease the battery life. Alternatively, by making a transducer squeak for 50 milliseconds (a duration that the ear can detect) when the battery is low upon receipt of ID coded RF signal 15, then the low battery will last longer than if an LED is used as a warning light.

In one embodiment, motor M1 draws 300 milliamps and takes about a second to unlock door 13 (i.e., to remove the latch of the deadbolt from the strikeplate). Typically, door 13 will be controlled by a battery holding approximately 200 milliamps hours of energy. If it takes about a second to unlatch the door and the motor draws 300 milliamps, then the door can be unlatched about 2400 times before exhausting the battery. In an alternative embodiment, door 13 may be capable of being wired so that an external power source can be used to operate the circuitry shown in FIG. 3, including motor M1. In this case battery B1 would not be needed.

Should the circuit fail for any reason, either through a dead battery or for any other reason, lock unit 14 can be mechanically overridden from the outside to unlock the door. A standard house key can be used to allow user 110 to enter the house. Thus, if the battery fails and the situation is such that a user 110 must enter the house for safety or to survive, a manual key can be used to override the system.

In one embodiment, the microprocessor 304 may be programmed locally using six-pin header 306 shown in FIG. 3. If for some reason an ID code stored in microprocessor 304 must be changed, then this change is implemented using the header 306. To delete an ID code, an appropriate delete button integrated inside the lock unit 14 is pressed. To add a key, a button integrated inside lock unit 14 is pressed and the new universal key is quickly brought in proximity of the reader 29. The reader 29 will sense the new ID code and submit the signal to terminal 301 on microprocessor 304 from pin 6 on header 306, which allows microprocessor 304 to be reprogrammed with a new code. This insures that if a key is lost or if someone is able to intercept the code being used to unlock door 13, the code can be easily changed, more quickly and with less hassle than a lock currently can be rekeyed. Thus, the lock unit 14 of this invention is capable of being used on rental units and in hotel units, which require quick and easy change of the ID code required to open the lock. Typically, the memory is such that the memory can be reprogrammed a large number of times. Commercially available flash memory or electrically erasable programmable read only memory can be used to store the code. In other embodiments, the microprocessor 304 may be programmed remotely, as will be described in greater detail below with respect to FIG. 7.

Lock unit 14 contains an antenna 23 for receiving signal 15 from universal key 12. In some embodiments, antenna 23 comprises a directional antenna unit that will enable lock unit 14 to receive signals only from one direction and only within a certain distance range. Antenna 23 can be provided as a separate component or can be integrated onto the printed circuit board containing the circuitry for receiver 22 and processor 24.

Solenoid-Driven Lock Unit

Figure 5:
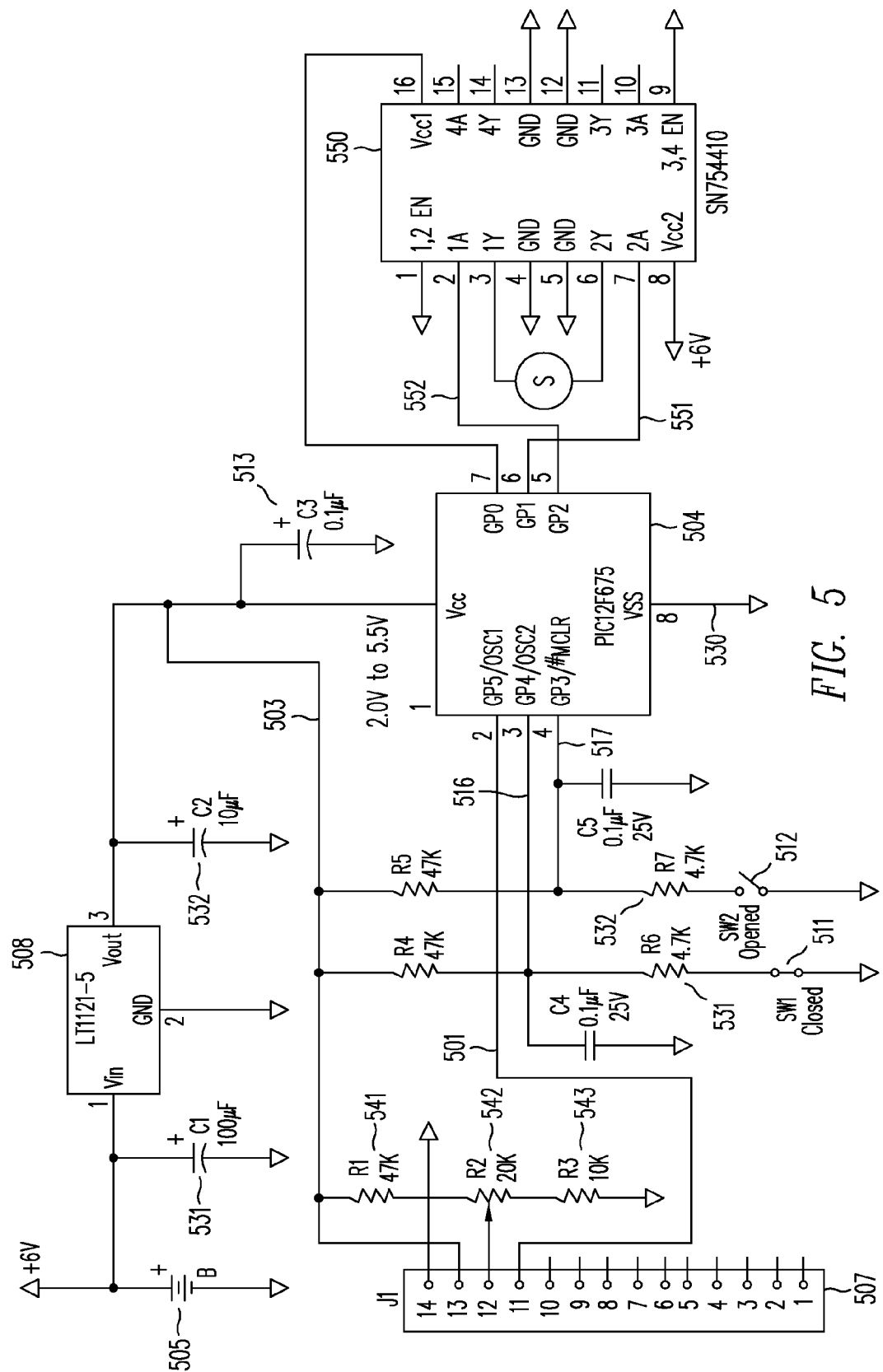
FIG. 5 is a schematic diagram of a door reader capable of processing an ID code received from a universal key by a receiver and then sent to the processor to position a solenoid that opens and closes a lock.

FIG. 5 shows a schematic diagram of an alternative embodiment of a processor for controlling a solenoid-driven actuator for a lock unit. In FIG. 5, the power supply 505 also provides six (6) volts or nine (9) volts. Capacitors 531 and 532 (100 microfarad and 10 microfarad, respectively) act as filters as they do in the circuit of FIG. 3 and the voltage regulator 508 is, e.g., an LT1121-5 three (3) terminal regulator from Linear Technology. The voltage output from voltage regulator 508 is sent to the microprocessor 504, which is, e.g., a PIC12F675 microprocessor, also from Microchip Technology, Inc. Capacitor 513 (0.1 microfarad) again filters the supply voltage that is input to pin 1 $V_{CC}$ of microprocessor 504. Ground ($V_{SS}$) is provided on terminal 530. Switches 511 and 512 are shown connected through resistors 531 and 532 (each 4.7 k ohms) to terminals 516 and 517, respectively, of microprocessor 504. The voltage from voltage regulator 508 is provided on terminal 503 to a connector 507. Connector 507 is coupled to receiver 22 to receive an electronic signal generated by the receiver 22 receiving the ID coded RF signal from the universal key. As with FIG. 3, a variable resistance including a potentiometer 542 and two fixed resistors 541, 543 is used to select a desired voltage level for the output signal on terminal 501 to microprocessor 504. The values of the resistors 541-543 in one embodiment are shown in FIG. 5.

If the ID code on the signal being transferred on terminal 501 matches an ID code stored in microprocessor 504, microprocessor 504 then sends a signal to driver circuit 550 on terminals 551 and 552. Driver circuit 550 may comprise, e.g., part no. SN754410 integrated circuit from Texas Instruments Inc., of Dallas, Tex. Driver circuit 550 then drives solenoid S to unlock the lockset. Solenoid S is reversible and following the opening and re-closing of the door, microprocessor 504 will then cause the solenoid S to drive the deadbolt back into the strike plate. Switches 511 and 512 can be used to control the operation of solenoid S, similar to the operation of switches 311 and 312 described above with respect to FIG. 3.

Universal Key

Figure 4:
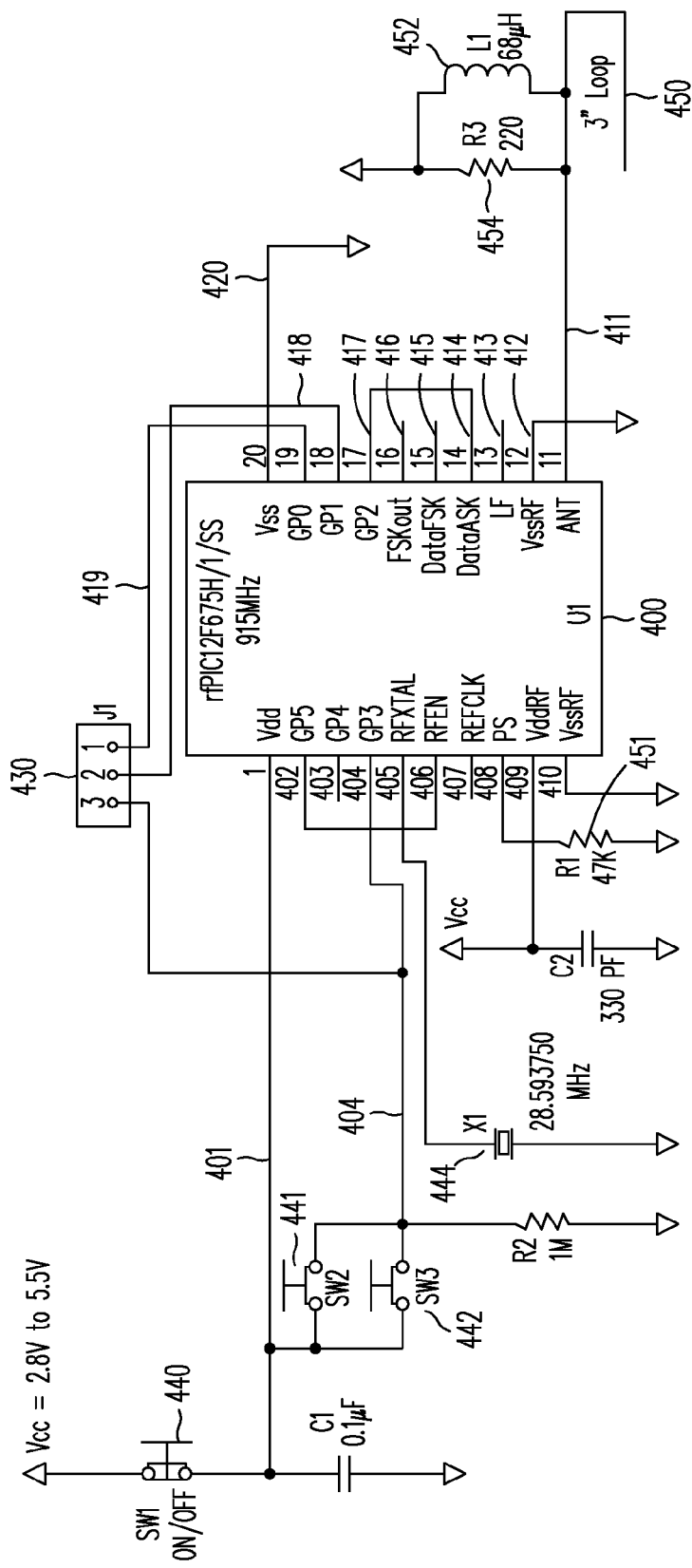
FIG. 4 is a schematic diagram of a universal key, incorporating a physical on/off switch and motion sensors as part of the battery saving circuit associated with one embodiment of this invention.

FIG. 4 shows a schematic diagram of an exemplary universal key 12, in accordance with an embodiment of the invention. The universal key 12 broadcasts the coded signal on, e.g., a carrier frequency of either 433.92 MHz or 915 MHz in the United States, or 868 MHz in Europe. Other transmission frequencies may also be used, such as in other countries which may require the use of other frequencies.

The universal key 12 in FIG. 4 includes microcontroller 400, which can be, e.g., model no. rfPIC12F675H, provided by Microchip Technology, Inc., in Chandler, Ariz. Microcontroller 400 contains both a computer (e.g., a microprocessor) and a built-in transmitter. Connector 430 provides access to terminals 404, 418 and 419 to allow programming of the microprocessor portion of this microcontroller 400. Terminals 401-404 and 417-420 allow selected signals to be sent to and received from the microprocessor portion of the microcontroller 400.

The power supply used can be, e.g., a half sized AA battery, half sized D battery, or any other appropriate power cell that provides the desired voltage, which is from 2.8 volts to 5.5 volts in the illustrated embodiment. In one embodiment, the battery (not shown) provides 3.6 volts $V_{DD}$ to terminal 401 of microcontroller 400. The notation "$V_{CC}$=2.8 Volts to 5.5 Volts" indicates the range of acceptable voltage levels provided to the circuitry in FIG. 4 from the power supply.

In some embodiments, the universal key is always on. However, the embodiment illustrated in FIG. 4 includes an on/off switch 440 that may be used by the user to deactivate the universal key should the need arise (e.g., while flying on a commercial airline). Switch 440 will, in one embodiment, comprise a reed switch and a magnet. When the magnet is placed near the reed switch, the switch remains open so no voltage will get to the device. When the magnet is moved from the reed switch, the reed switch will resume its normal position allowing voltage to be transmitted to microcontroller 400 and thereby turning on the universal key to send out periodic signals to the environment. In a second embodiment, switch 440 will be comprised of the battery compartment, battery and lid. After the battery is inserted in the battery compartment, the lid is inserted and turned a half turn. This will create a watertight seal but will not create a closed circuit. When the lid is turned an additional half turn, the battery is pushed forward, thus making contact with the electrical leads and completing the circuit. Only in this position will the microcontroller 400 be powered and the universal key transmit.

One embodiment also includes switches 441 and 442, which comprise motion sensors that determine when the universal key is moving. If either switch 441 or 442 does not sense activity for a specified time, the electronic circuitry in the universal key goes into a sleep mode (in which no signals are transmitted), which prolongs battery life. Once the motion detectors determine the universal key is in motion, the circuitry awakens and allows the universal key to send two (2) pulses a second to the environment. This will activate any lock within range of the universal key. In one embodiment, switches 441 and 442 comprise motion sensors (P/N NM3001-1) manufactured by Signal Systems International, of Lavallette, N.J. When moved, they cause connections to be periodically made between the battery and terminal 404 of microcontroller 400, thereby turning on microcontroller 400 for a specified period of time. Frequent motion will result in the universal key remaining on continuously. In other embodiments, the motion sensors may be implemented using other mechanisms, as would be understood by those of ordinary skill in the art.

Crystal 444 provides a frequency of 28.593750 MHz to terminal 405 of microcontroller 400. The structure inside microcontroller 400 includes a phase locked loop that multiplies this frequency by 32 to get to exactly 915 MHz. The operation of microcontroller 400 is described in product literature from Microchip Technology Inc., such as the Data Sheet for rfPIC12F675K/675F/675H, 20-Pin FLASH-Based 8-Bit CMOS Microcontroller with UHF ASK/FSK Transmitter, which is hereby incorporated by reference in its entirety. Terminal 402 connects the microprocessor portion of microcontroller 400 to the transmitter portion of microcontroller 400. The transmitter portion of microcontroller 400 contains analog circuits capable of transmitting an RF signal from terminal 411 to the antenna 450, thereby causing a 915 MHz signal to be transmitted from antenna 450.

In the illustrated embodiment, the code sent out from the universal key includes six 8-bit codes. The universal key sends out a 25 millisecond burst every half second. Between each 25 millisecond burst, the universal key sleeps. This continues so long as the motion sensors indicate that the user is moving and thus the universal key should be sending out a signal. Thus, the universal key operates on about a 5% duty cycle when the key is activated. The ID coded signal specifically sent by the transmitter portion of the microcontroller 400 can contain any one of up to approximately 81 billion codes. Thus, the code number associated with each person can be truly unique to that person.

Microcontroller 400 has two grounds. One ground is associated with the microprocessor portion of microcontroller 400 on terminal 420, and the other ground is associated with the transmitter portion of microcontroller 400 on terminal 410. Terminal 408 associated with the transmitter is connected through a 47 k ohm resistor 451 to ground. This resistor 451 sets the RF output power.

Universal Key Antenna

As shown in FIG. 4, antenna 450 is coupled to terminal 411 of the transmitter portion of microcontroller 400. An inductor 452 in parallel with the 220 ohm resistor 454 connects the antenna 450 to a power supply, which can be the same as or distinct from the power supply powering microcontroller 400. Resistor 454 broadens the frequency resonance of the inductor 452.

Figure 6:
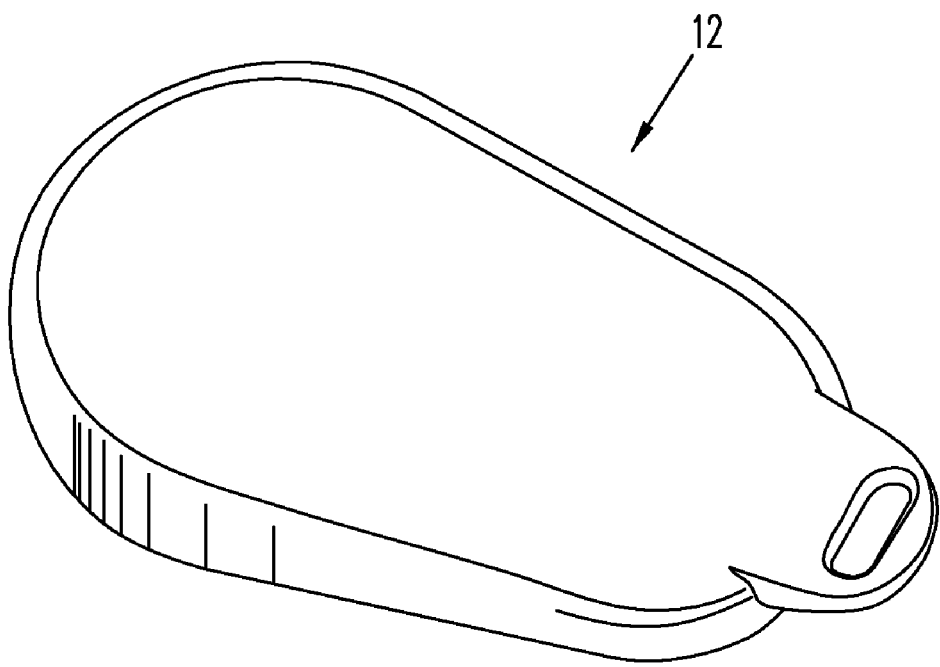
FIG. 6 shows an exemplary universal key, in accordance with one embodiment of this invention.
Figure 8:
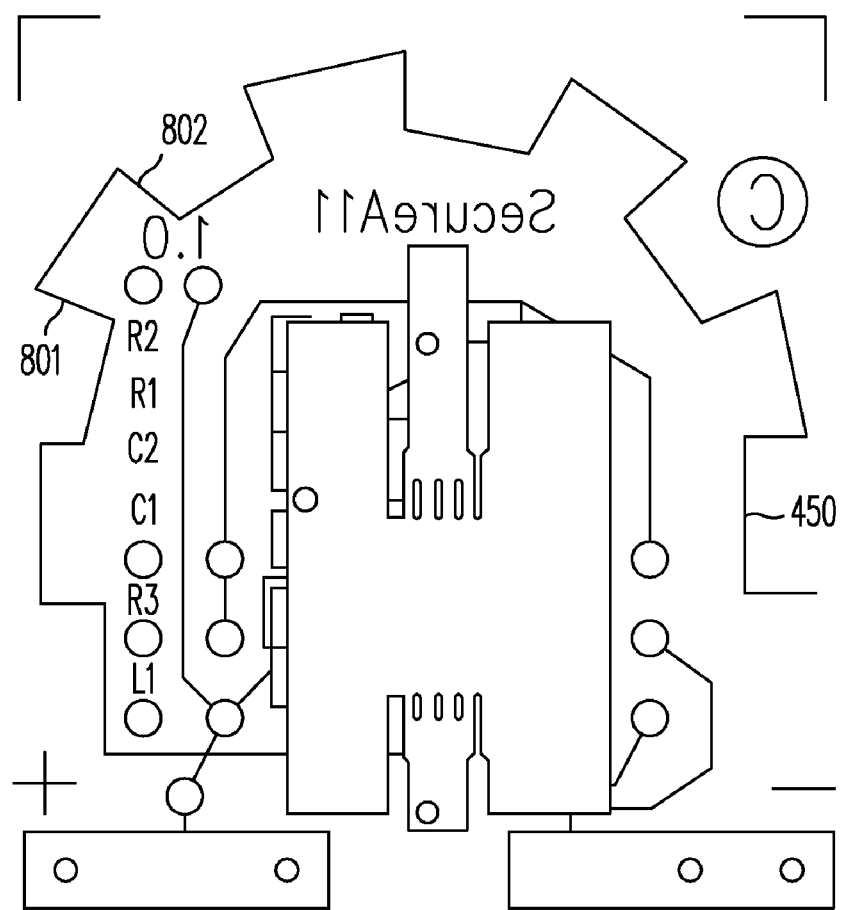
FIG. 8 illustrates a sprocket structure associated with the universal key's antenna to optimize omni-directional transmission distance, in accordance with one embodiment of the present invention.

Various types of antennas 450 may be used for the universal key. FIG. 8 shows a printed circuit board layout for a quasi-omnidirectional antenna 450 in accordance with one embodiment of the present invention. When transmitting an RF signal, output power is optimized when the antenna has a length that is a multiple of one-quarter of the wavelength of the transmitted RF signal. In the present embodiment, the RF signal frequency is 915 MHz, thereby making the preferred antenna length approximately 3" or some multiple thereof. However, it is also desirable to provide a universal key with compact dimensions so that the key may be unobtrusively carried by the user. FIG. 6 shows an exemplary universal key 12 that is 2" long, 1.25" wide, and 0.375" thick, which is smaller than the minimum preferred antenna length of 3".

As shown in FIG. 8, it is possible to fit a 3" long antenna into a smaller package by arranging the antenna in a serpentine or meandering shape Unfortunately, the electromagnetic signals generated by the current passing through the radial portions of the antenna (e.g., portions 801 and 802) will cancel each other out due to opposite electromagnetic fields generated by the oppositely directed currents, thereby diminishing the overall transmission power of the antenna. However, the resulting output power will still far exceed what would be generated by an antenna with a length other than a quarter wavelength multiple. Accordingly, the antenna can be an effective radiator with the amount of power being controlled by the meandering sprocket pattern of the antenna. This design minimizes the planar area within which a quarter-wavelength long antenna can be housed, while also minimizing the undesirable signal cancellation effects of oppositely directed currents.

The illustrated universal key antenna is capable of broadcasting a signal well over 300 feet. To control the distance at which a signal from the universal key will open a lock unit, the antenna, reader circuitry, and other electronics within the lock unit are designed to be able to "hear" the universal key at a specific distance and from a prescribed direction. In other words, the reader will only recognize a signal from a prescribed direction and having a minimum prescribed strength. The distance within which the universal key must be from the lock unit for the lock unit to detect the signal from the universal key is determined by the strength of the signal that reaches the processor circuitry, which is controlled by the gain of the antenna and the receiver circuitry.

Garage Lock Reader

Figure 7:
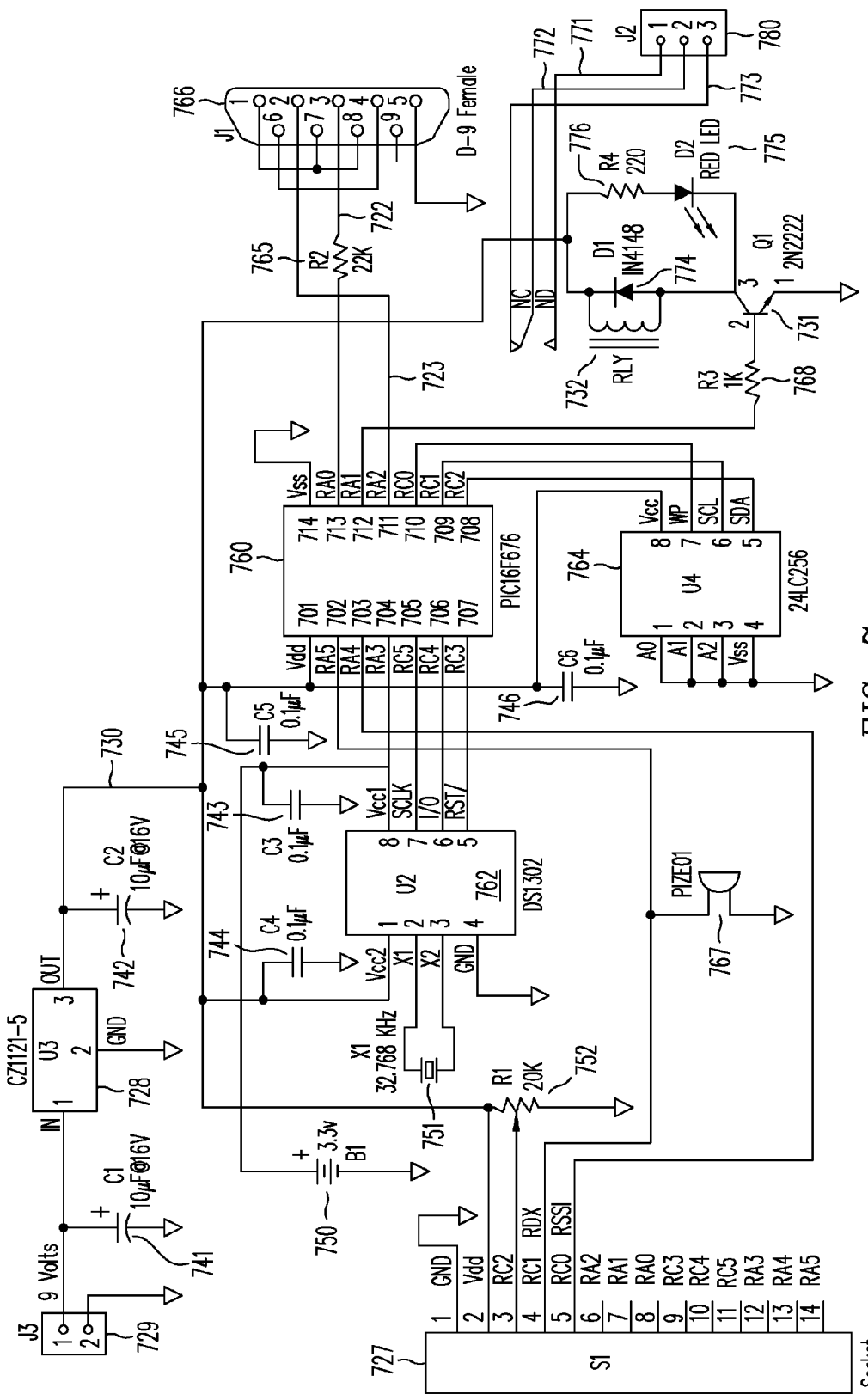
FIG. 7 is a schematic diagram of an alternative embodiment of a circuit for processing a received signal to drive a relay that controls a lock.

FIG. 7 shows a schematic diagram associated with the circuitry for reading and processing the signal received from the universal key, and for reading computerized control signals from a remote control system 28 at a remote location (as shown in FIG. 2). This circuitry can be used, e.g., to control commercially available automatic garage door openers, as will be described in greater detail below.

This circuitry performs a similar function to the circuitry described in FIG. 3. Some differences are that the circuit in FIG. 7 uses a 9 VDC power supply, receives control signals from a remote source (e.g., RS232 control signals received from an RS232 serial source, such as a computer), in addition to the ID code signals from the universal key. This embodiment also contains additional circuits, said circuits including additional flash memory 764, time and date keeper with battery back-up 762, and a mechanical relay circuit capable of triggering the opening and closing of non-proprietary third-party locks and gates. These differences are further described in detail below.

A connector 727 is coupled to a receiver 22 (one embodiment of which is shown in detail in FIG. 9), which detects the RF signal from universal key 12. A second input/output connector 766 is coupled to remote control system 28. Connector 766 receives an RS232 signal input from a computerized source, such as an RS232 signal from a computer, or from a "bridged" converter whose source is any of several existing signals and protocols, which include but are not limited to Ethernet, Universal Serial Bus (USB), modem, RS485, RS422, or similar communication protocols. The RS232 input signals arrive on terminal 722, pass through a limiting 22K ohm resistor 765 and enter microcontroller 760 through terminal 713, where they are decoded by the software and acted upon.

In one embodiment, the RS232 input signals are single character commands to microcontroller 760. These commands request certain actions from microcontroller 760, such as reading/setting the time and date contained in the time and date circuit 762 (e.g., integrated circuit, part no. DS1302, by Dallas Semiconductor, of Dallas Tex., or other similar time and date chips). Additional commands include, e.g., requesting a list of universal key codes, showing if they are enabled or disabled, and commands that cause particular universal key codes to be enabled or disabled. Further commands may include requesting a memory dump of recent activity, which consists of time stamped system hits from universal keys, including the date, time and universal key ID code.

Microcontroller 760 (e.g., a PIC16F676 microcontroller from Microchip Technology, Inc., in Chandler, Ariz. or other similar microcontroller), contains software that processes the received commands and responds accordingly by sending an RS232 response signal out of terminal 711 to connector 766, and thence out to the requesting authority.

In other embodiments, the readers described above with respect to FIGS. 3 and 5 may be provided with a similar mechanism for enabling the microprocessors to be remotely programmed.

Voltage regulator 728 processes the 9 VDC input power applied to connector 729 and outputs a regulated +5 VDC on terminal 730 for use by the other components using terminal 730 as a power rail. These other components include the RF receiver 22 coupled to connector 727, time/date IC 762, microcontroller 760, flash memory 764, and relay-driver transistor 731 powered through a series connection with the relay coil 732.

The above power distribution uses capacitors 742, 744, 745, and 746 as noise filters on terminal 730. Capacitor 741 is used as a noise filter on the 9 VDC input power line and capacitor 743 is used as a noise filter on the 3.3 VDC supply rail from the back-up battery source 750.

Similar to FIG. 3, variable resistor 752 is used to provide the desired input voltage to microcontroller 760 from connector 727. An audio transducer 767 may also be connected to terminal 702 of microcontroller 760 to provide an audio test output while the serial signal is in progress. A relative signal strength indication (RSSI) is generated by RF receiver 22 (FIG. 2) and is received at terminal 703 of microcontroller 760. The software in microcontroller 760 can use the RSSI signal in situations where it is required to ascertain if a universal key is approaching (RSSI increasing) or departing (RSSI decreasing) from the RF receiver antenna.

The flash memory chip 764 (e.g., a 256 byte 24LC256 serial flash memory chip from Microchip Technology or other size memories from Microchip Technology or other manufacturers) is controlled by software in microcontroller 760. Microcontroller 760 communicates serially with the flash memory 764 through terminals 708, 709, and 710. Microcontroller 760 communicates serially with time/date IC 762 through terminals 705, 706, and 707. Time/date IC 762 normally is powered by the +5 VDC supply rail on terminal 730, but derives back-up power through 3.3V battery 750, which allows the time/date IC 762 to continue functioning for long periods should the main 9 VDC power be interrupted. Time/date IC 762 uses crystal 751, e.g., a 32.768 KHz crystal, for its time-base. Upon receipt of an ID code from a universal key, microcontroller 760 fetches the time and date from time/date IC 762, and then stores the received ID code with the time and date of reception into flash memory 764. The software in microprocessor 760 can request a "memory dump" of the contents of flash memory 764, when so commanded by a signal from the RS232 serial input from connector 766.

The microcontroller software determines whether the ID code received from a particular universal key is either valid of invalid. If invalid, the event is saved in flash memory 764 and no further action is taken. If valid, the event is saved in flash memory 764 and microcontroller 760 causes a mechanical relay contact closure, or opening as required, to operate non-proprietary third-party lock and gate equipment. This action is effected when microcontroller 760 places a "1" on terminal 712 going through 1K ohm resistor 768 to the base of bipolar transistor 731. This saturates and draws current through the mechanical relay coil 732, causing relay 732 to open the contact connection between terminals 772 and 773, and to close the contact connection between terminals 772 and 771. A diode 774 across relay coil 732 is a protection device that limits the voltage across relay coil 732 to a low value when coil 732 is de-energized. The diode LED 775 across relay coil 732, in series with 220 ohm resistor 776, is an indicator that illuminates while the relay is energized. The mechanical relay contacts are of type single-pole double-throw (SPDT) and connect to terminal block 780. Many third-party gates and locks employ contacts of the type provided as auxiliary switches to energize their motor controllers that open and close their gates and locks.

Lock Receiver

Various types of receivers may be used in lock units for receiving wireless signals from universal keys. As described above, one exemplary receiver is RF receiver rfRXD0920, available from Microchip Technology Inc. In accordance with another embodiment, the low cost, low sensitivity, and low power RF receiver shown in FIG. 9 may be used to detect and amplify the signal from the universal key and extract the universal key ID code.

The RF signal impinges on the antenna 900 coupled to terminal 901 and creates a very weak electrical signal which is an analog of the RF signal. The antenna 900 is of such design as to offer some selectivity to the frequency of the RF signal from the universal key and further, to offer some insensitivity to the other signals in the RF spectrum.

Figure 9:
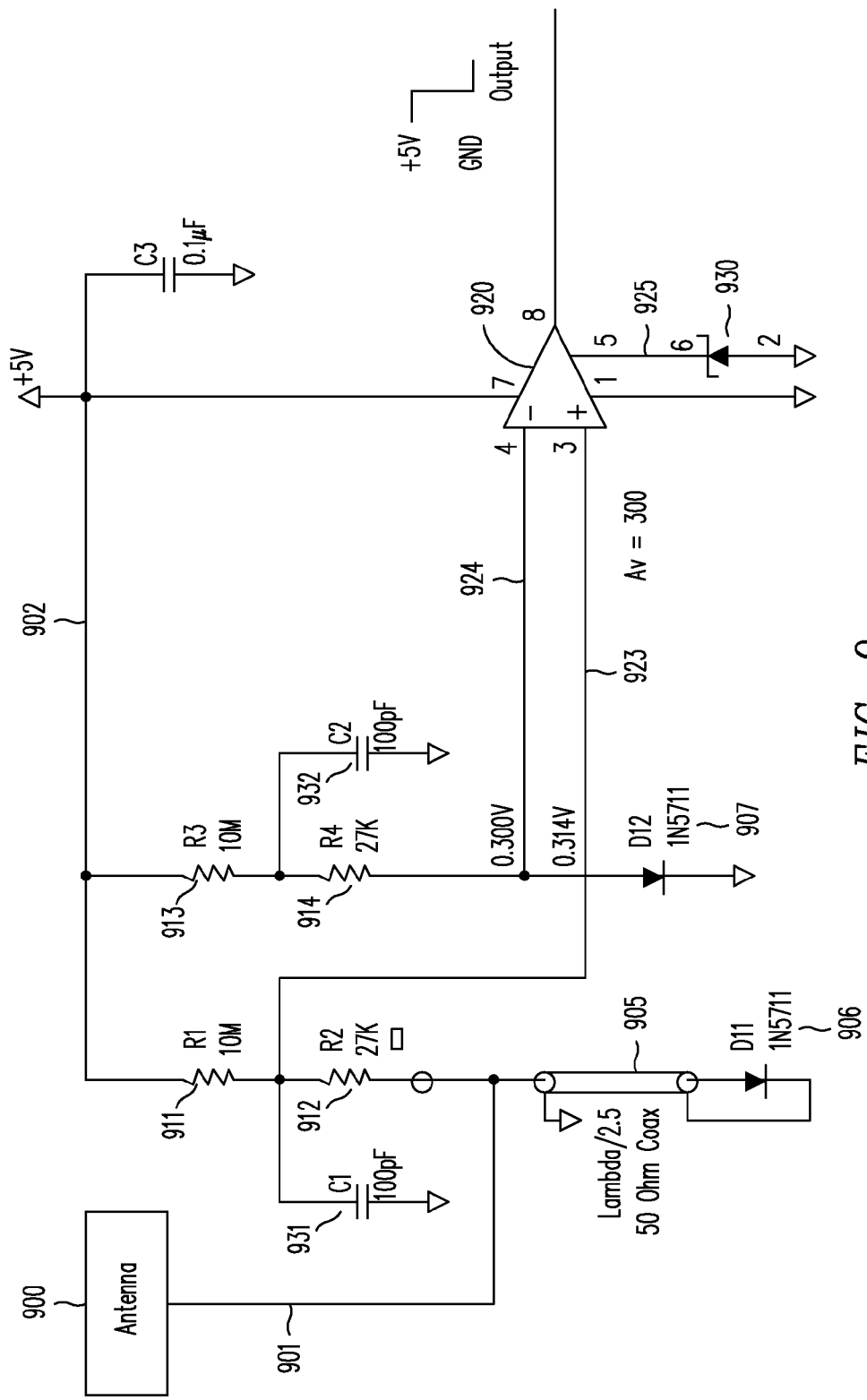
FIG. 9 illustrates a simple inexpensive receiver for use with a lock unit in one embodiment of the present invention, such as a lock for a short range application.

The electrical signal on antenna 900 is presented to a bandpass filter, shown as filter 905 in FIG. 9. Bandpass filter 905 is a surface acoustic waveform (SAW) filter, but may in other embodiments be any other type of filter that further increases the selectivity of the RF electrical signal analog from antenna 900. This signal is passed to the anode of a small signal Schottky diode 906 where the signal is rectified. The illustrated embodiment uses a 1N5711 Schottky diode manufactured by STMicroelectronics of Geneva, Switzerland, but diodes performing a similar function may also be used. This rectification, also called RF detection by those skilled in the art, recovers the original modulation signal impressed upon the RF signal by the universal key, and thereby retrieves the transmitted code ID from the universal key.

A power rail 902 is provided having, e.g., +5V, although other power rail voltages may also be used. Capacitors 931 and 932 filter electrical noise that may be present on power rail 902. The Schottky diode 906 is forward biased by current from series resistors 911 and 912 attached to power rail 902, to further enhance its signal detection ability. This bias current causes a small voltage to appear across diode 906. A similar situation exists in the circuit formed by series connected resistor 913, resistor 914, and diode 907. The voltage drops across diodes 906 and 907 remain almost identical as the ambient temperature varies, and these diodes are said to "track" the temperature changes. This "tracking" function is designed to present a common mode voltage to the comparator 920, which can be, e.g., a model no. LTC1440 comparator by Linear Technology Corp. of Milpitas, Calif. Although the LTC1440 comparator is used in this embodiment, other comparators can be used. Terminal 925 on comparator 920 shows a connection to an internal zener diode 930 that is part of the LTC1440 device, but its function is not used in this embodiment.

With no signal from the antenna, the output of comparator 920 is biased to zero volts due to the fact that the voltage on terminal 924 is very slightly higher than the voltage on terminal 923. This bias is due to a higher voltage on the top of resistor 912 than appears at the bottom of resistor 914.

When an RF signal from antenna 900 is detected by diode 906, the signal passes serially to an "envelope extractor" circuit comprised of resistor 912 and capacitor 931. This extracted envelope is a low amplitude version of the coded ID transmitted by the universal key. The low amplitude signal is sufficient to cause the output signal from comparator 920 to reproduce this low amplitude signal at a high amplitude suitable for use by a microcontroller, such as microcontroller 304 in FIG. 3.

Universal Key Transceiver

In the above description, one-way transmission from a universal key transmitter to a lock unit reader is described. Alternatively, the universal key and the lock unit may include transceivers to provide bidirectional communication. A transceiver in the lock unit may be configured to send out an interrogation signal sufficiently strong to be received by a transceiver in the universal key and "wake up" the universal key when the key comes within a selected distance of the lock unit. The universal key in this embodiment would always be asleep until the key receives the RF signal from the transceiver in the lock unit. As soon as the universal key receives that signal, the key would in response send out an RF signal having an ID code unique to the individual holding the universal key. When the lock unit's transceiver receives this transmitted signal and the processor determines that the ID code is acceptable, the lock unit actuator would cause the lockset to be activated to allow the door to be opened. One advantage of providing two-way communication between the universal key and the lock unit is that encryption may be used for the transmissions. In addition, universal key battery life is improved since the universal key does not transmit any signal until prompted by the lock unit transmission. The universal key then returns to a sleep mode.

Figure 10:
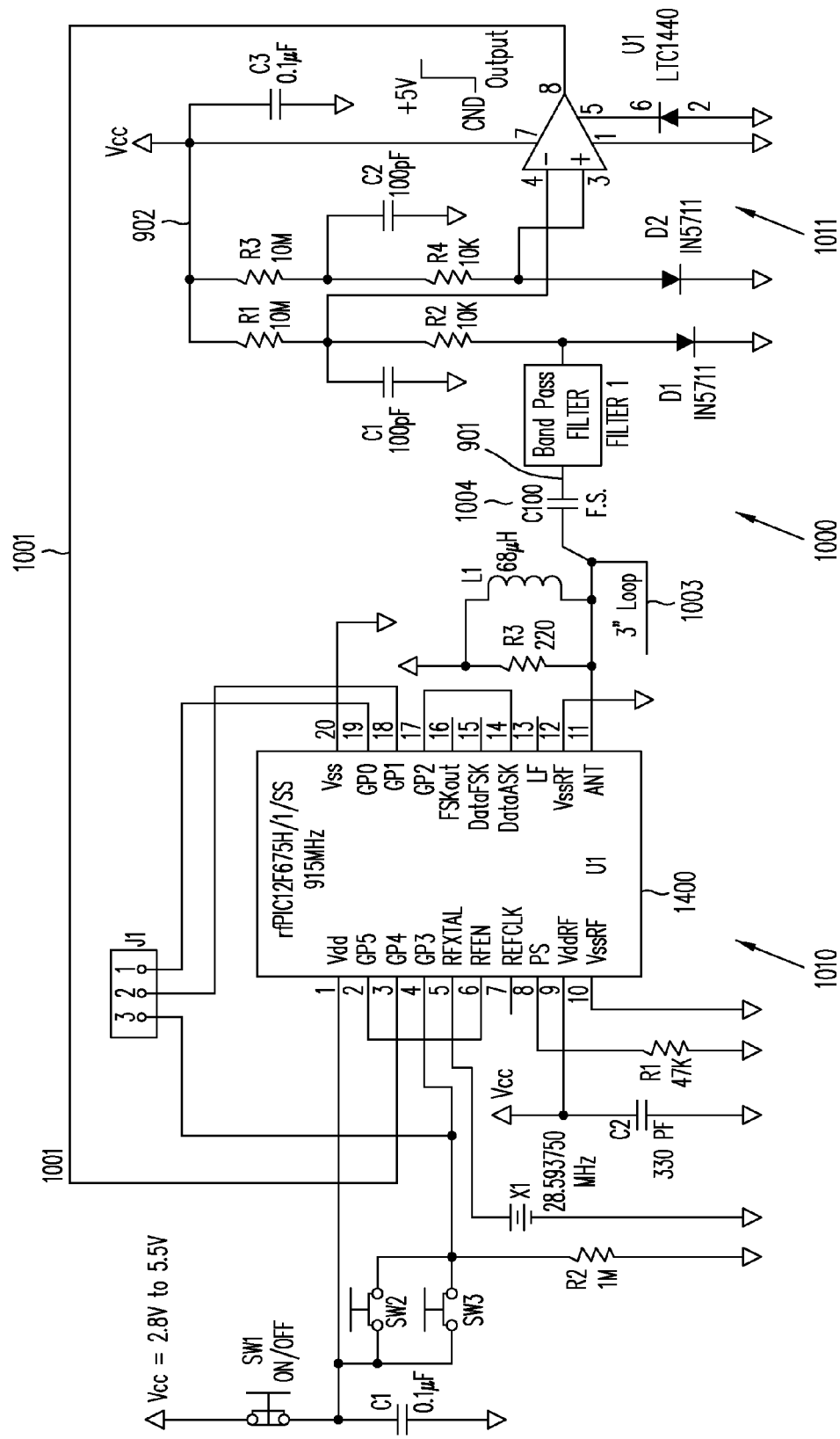
FIG. 10 is a schematic diagram of a transceiver circuit associated with the universal key, in accordance with one embodiment of the present invention.

FIG. 10 shows a schematic diagram and certain circuit components associated with universal key transceiver 1000. Universal key transceiver 1000 comprises a transmitter portion 1010 and a receiver portion 1011 coupled to an antenna 1003. Transmitter portion 1010 is similar in design and operation to the transmitter shown in FIG. 4, and the receiver portion 1011 is similar in design and operation to the receiver shown in FIG. 9. These two portions 1010, 1011 enable the combined transceiver 1000 to both transmit and receive RF signals from another transceiver. In this embodiment, the other transceiver resides in the lock unit, but can also reside in any other device that provides access control using the universal key.

One advantage of using two transceivers with bidirectional communication is the ability to negotiate with other transceivers for the purpose of operating a third circuit. In this embodiment, the third circuit opens and closes a lock when certain identification is established through two-way encryption negotiation, but can also operate other mechanisms and systems.

The output terminal 1001 of receiver portion 1011 carries a demodulated RF signal that contains appropriately coded information that is input to microcontroller 1400. In this embodiment, the microcontroller software bases its own subsequent RF signal response upon the encryption negotiation requirements of the transmitter portion 1010 and the receiver portion 1011, although other communications may also take place.

In this embodiment, transmitter portion 1010 and receiver portion 1011 share a single antenna 1003 for use by transmitter portion 1010 to transmit an RF signal and for use by receiver portion 1011 to receive an RF signal. Therefore, the RF output terminal of transmitter portion 1010 is coupled to an antenna that is also coupled to the RF input terminal of receiver portion 1011 by a capacitor 1004. However, other methods of coupling the RF energy between the two portions 1010, 1011 and the single antenna 1003 may also be used.

Lock Reader Transceiver

Figure 11A:
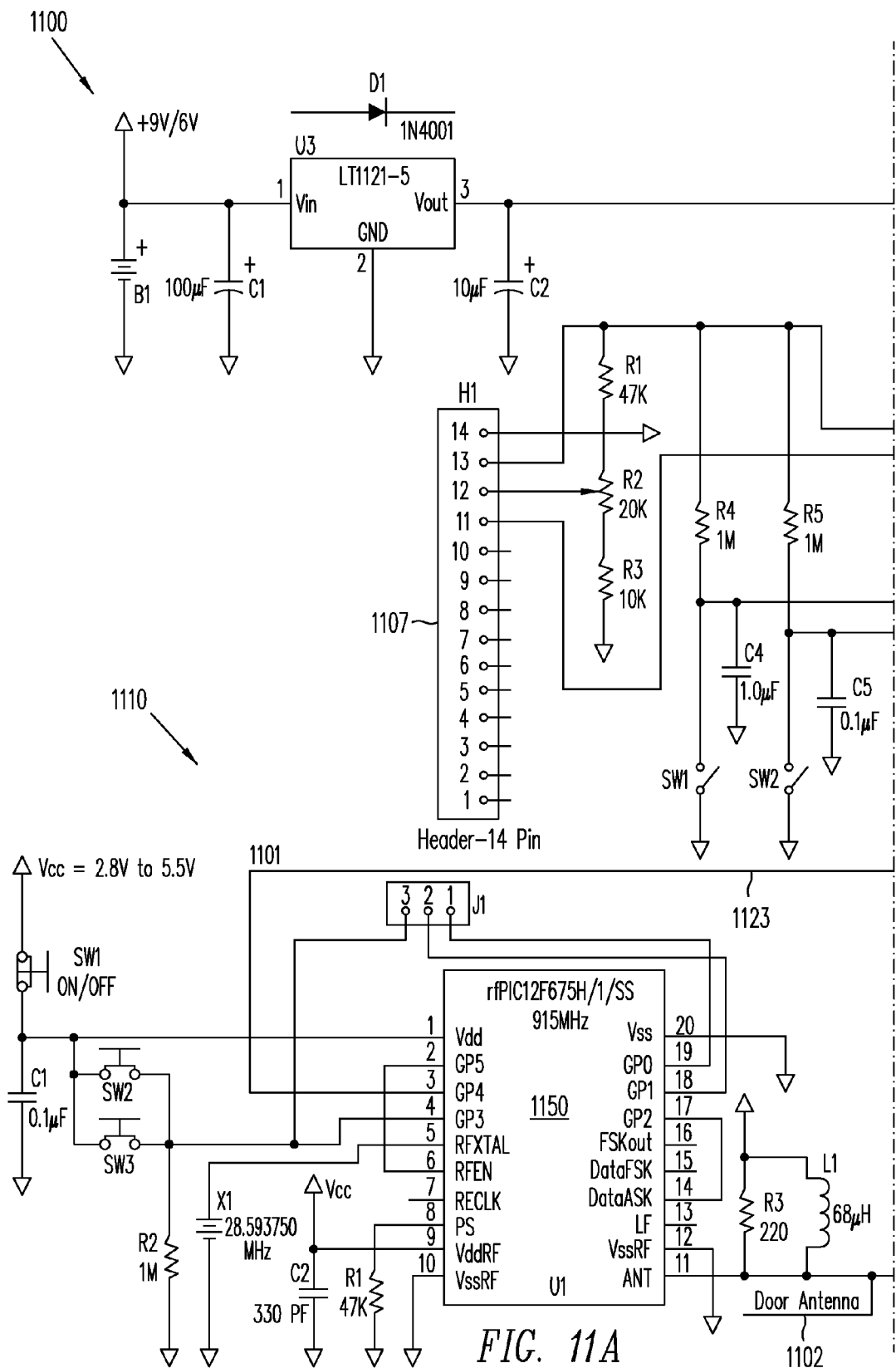
FIG. 11 is a schematic diagram of a transceiver circuit associated with the lock reader, in accordance with one embodiment of the present invention.
Figure 11B:
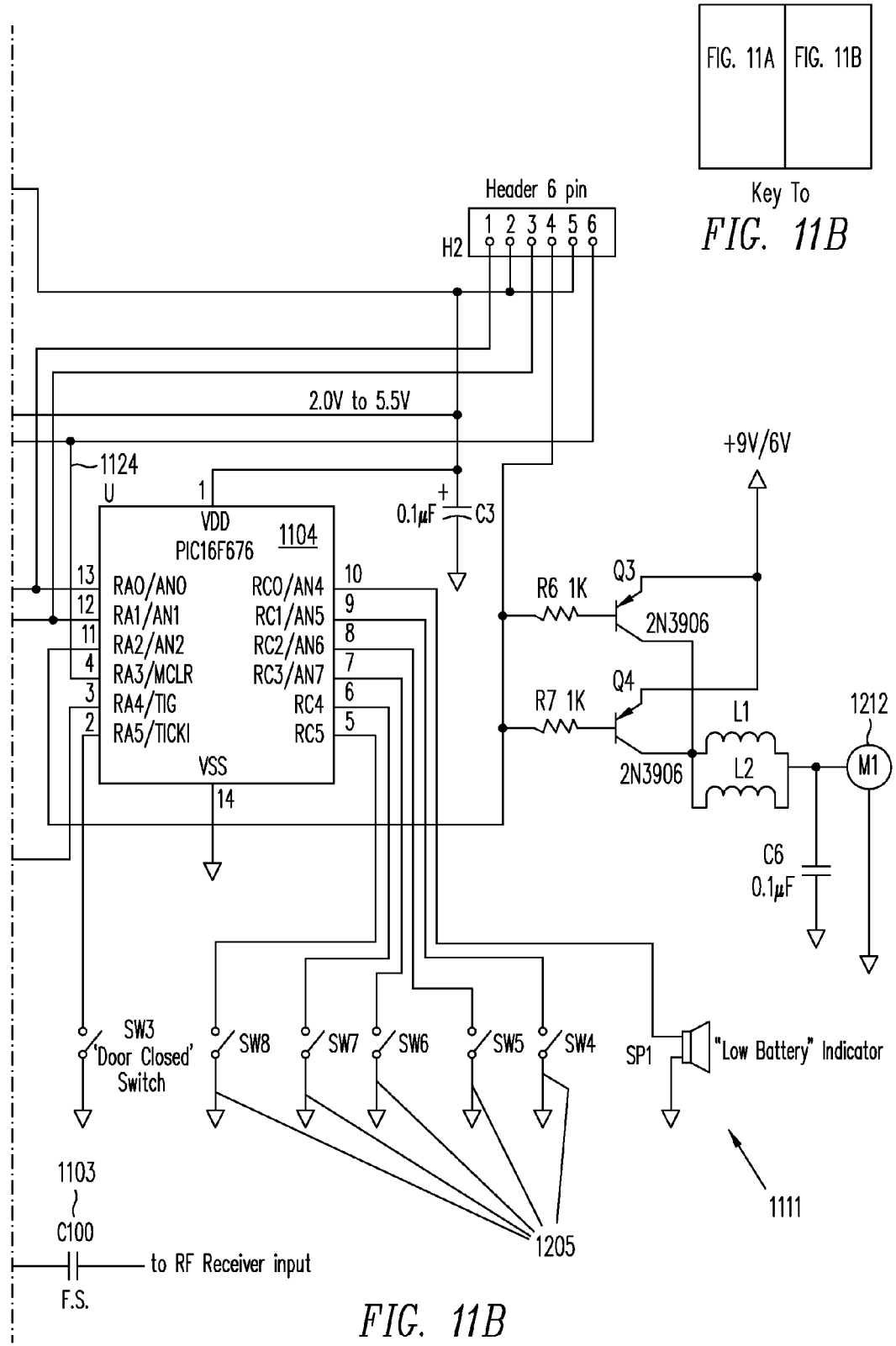

FIG. 11 shows a schematic diagram and certain circuit components associated with the lock reader transceiver 1100, in accordance with one embodiment of the present invention. Lock reader transceiver 1100 comprises a transmitter portion 1110 and a receiver portion 1111 coupled to an antenna 1102. Transmitter portion 1110 is similar in design and operation to the transmitter shown in FIG. 4, and the receiver portion 1111 is similar in design and operation to the receiver shown in FIG. 3. These two portions 1110, 1111 enable the combined lock reader transceiver 1100 to both transmit and receive RF signals from another transceiver (e.g., universal key transceiver 1000).

In this embodiment, the microcontroller 1104 may comprise, e.g., a model no. PIC16F676 microcontroller, manufactured by Microchip Technology. The PIC16F676 microcontroller has a larger number of I/O pins than the PIC10F200 microcontroller 304 described above with respect to FIG. 3. In other embodiments, any microcontroller with an adequate number of I/O pins may be used.

In this embodiment, the extra microcontroller I/O pins are provided to enable additional functionality. One additional function is to detect a "door closed" switch, which, in the microprocessor software of the microcontroller 1104, inhibits inserting the deadbolt into the strike plate until the door is completely closed. Other additional I/O functions may include providing user switches or pushbuttons to command the microcontroller software to delete a previously valid ID code, and/or to add a new valid ID code to the memory of microcontroller 1104. Another I/O function may be providing an audio alarm that indicates a "low battery voltage" condition. In other embodiments, the additional microcontroller I/O pins may also be used for other purposes.

In this embodiment, antenna 1102 comprises a directional antenna that receives RF signals emanating from outside of the door with high sensitivity and RF signals emanating from the inside of the door (e.g., inside the apartment or room) with very low, or zero, sensitivity. In other embodiments, non-directional antennas can also be used for other locking systems.

The lock reader transceiver 1100 shown in FIG. 11 provides a two-way RF communication system. An input signal on terminal 1124 of microcontroller 1104 is the eventual result of an RF signal from an RF receiver plugged into header 1107. The output signal on terminal 1123 of microcontroller 1104 goes to microcontroller 1150. In this embodiment, the microcontroller software bases its own subsequent RF signal response upon the encrypted negotiation requirements of both the microcontrollers 1104 and 1150, although other communications may also take place.

In this embodiment, the microcontrollers 1104 and 1150 share a single antenna 1102 for use by microcontroller 1150 to transmit an RF signal and for use by microcontroller 1104 to receive an RF signal by way of header 1107. Therefore, the RF output of microcontroller 1150 is coupled to an antenna 1102 that is, in turn, coupled to the RF input of the microcontroller 1104 by capacitor 1103. However, other methods of coupling this RF energy between the two microcontrollers 1150 and 1104 and the single antenna 1102 may also be used.

Directional Sensitivity

As described above, in some embodiments, the lock unit is configured to receive only signals transmitted on one side of the secured portal (e.g., the front door to a home). This can be accomplished in a variety of ways, but in one embodiment, to make the lock unit sensitive to a transmitted signal coming from outside the door, but not from inside the house, a physical barrier to electrical signals is used. For example, a metal plate may be placed between the antenna 23 and the inside of the house. The metal plate blocks all transmission signals originating from inside of the house to the antenna 23 and thus prevents signals which may come from inside the house from activating the lock.

Other mechanisms may be used for selectively receiving universal key signals from a particular direction. Depending on specific user need, with some locks omni-directional antennas can be used while with other locks, very specific directional antennas can be used. In one embodiment, the lock unit includes two antennas, one receiving signals preferentially from a first side of the door and a second receiving signals preferentially from an opposite side of the door. If a signal is detected by the antennas, the reader 29 will compare the two signals and will conclude that the universal key is located on the side of the door having the stronger signal. If a signal is thus detected coming from one side of the door, the door will not be unlocked whereas if a signal is detected as coming from the other side of the door, the door will be unlocked.

Lock Unit

Figure 12A:
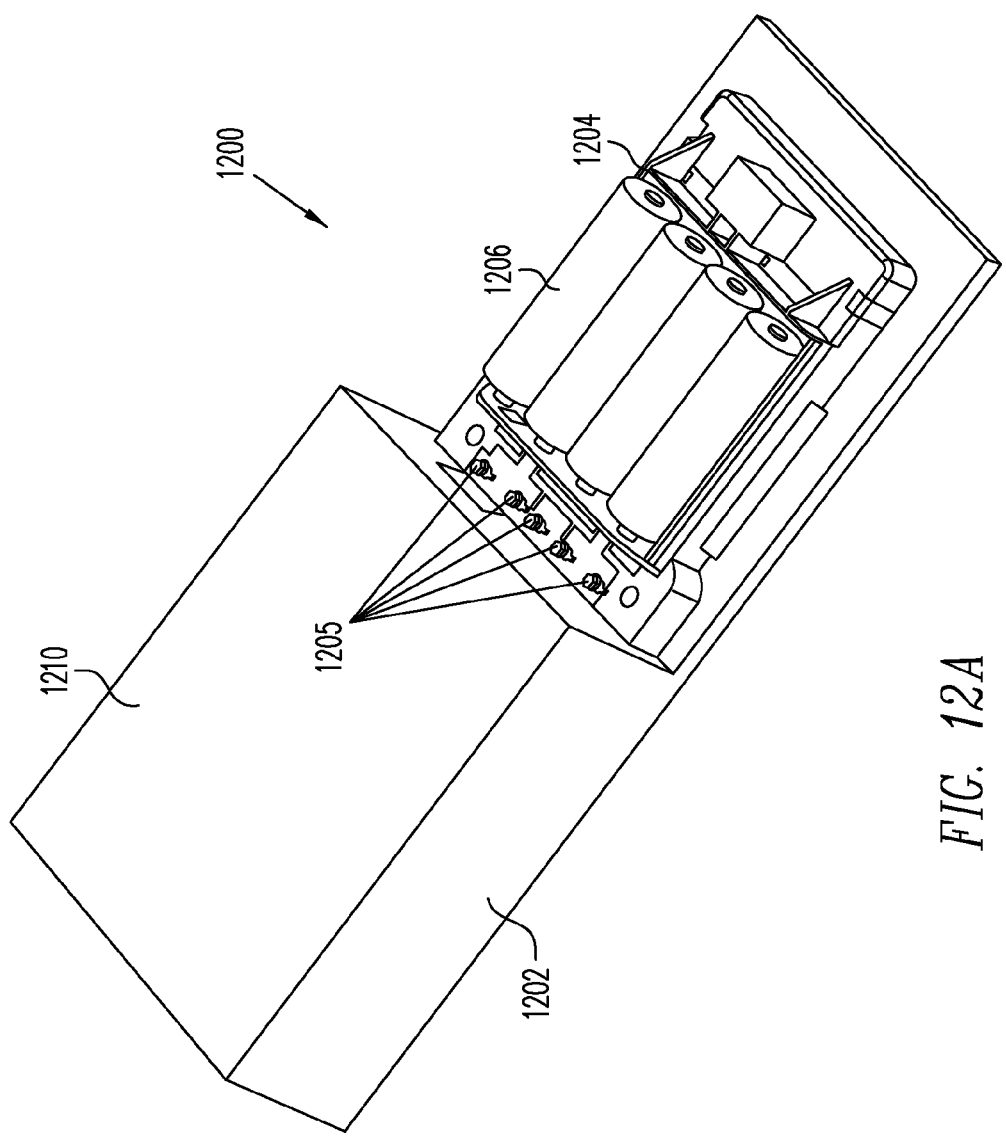
FIGS. 12A-12C are perspective views of a lock unit, in accordance with one embodiment of the present invention.
Figure 12B:
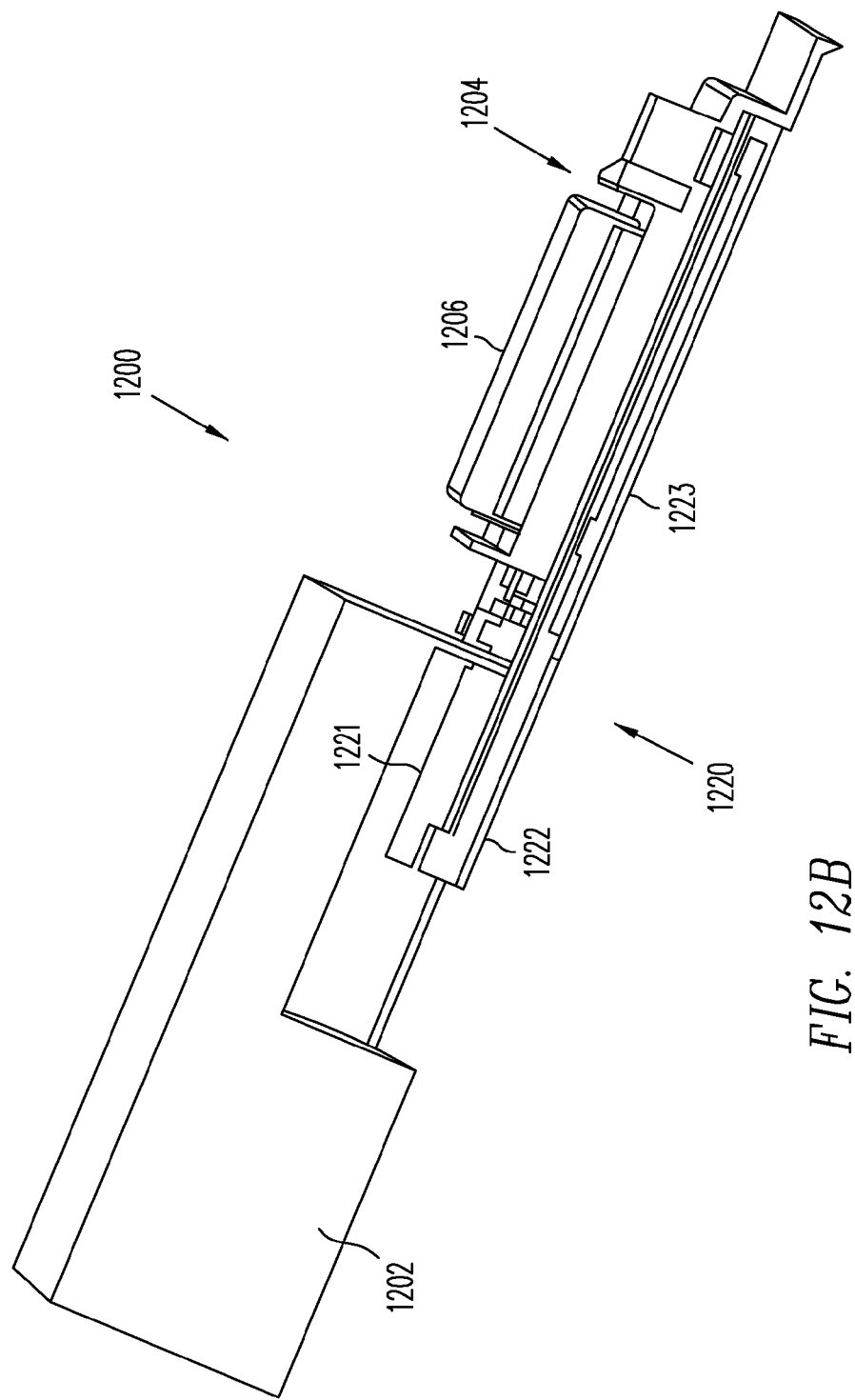
Figure 12C:
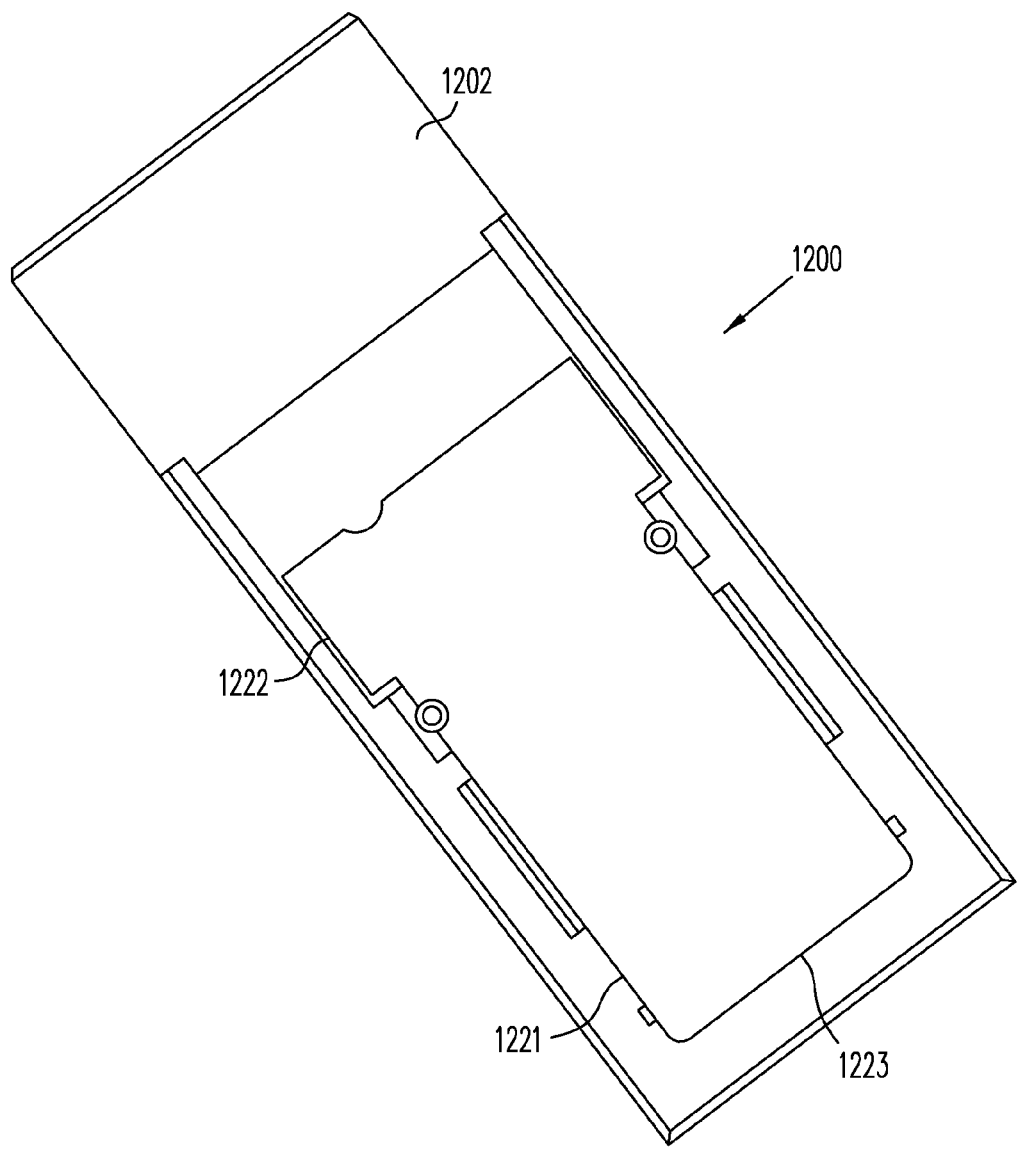

FIGS. 12A-12C show various views of a lock unit 1200 that could be mounted to a door, in accordance with one embodiment of this invention. FIG. 12A is a perspective front view of the lock unit 1200, showing the side of the lock unit 1200 that would face inside of the room. FIG. 12B is a cross-sectional side view of lock unit 1200. FIG. 12C is a back view of lock unit 1200, showing the side of lock unit 1200 that would face the door onto which lock unit 1200 is mounted.

In this embodiment, lock unit 1200 comprises a housing 1202 and a battery bay 1204 containing four AA batteries 1206. In other embodiments, other types of power sources may be used, such as other size batteries or rectified A/C power. A battery bay cover would also be provided but is not shown in the figures for clarity. Five (5) switches 1205 are exposed in FIG. 12A. These switches 1205 are coupled to microcontroller 1104, as shown in FIG. 11, to enable local programming of microcontroller 1104. These switches may also be used to allow for the addition of new features and functionality for future designs. A lock region 1210 in the housing 1202 contains the lockset actuator and the gearing necessary to open and close the lockset. This embodiment utilizes a motor 1212 (shown in FIG. 11; not shown in FIGS. 12A-12C) to drive the lockset.

The cross-sectional view in FIG. 12B exposes the door reader 1220 of lock unit 1200. In this embodiment, door reader 1220 comprises three separate PCBs, base PCB 1221, chipset PCB 1222, and antenna PCB 1223. Base PCB 1221 attaches to housing 1202 and includes switches 1205 and the electrical interface to batteries 1206. Chipset PCB 1222 couples to base PCB 1221 and contains the majority of the circuitry utilized to implement the receiver and processor. Chipset PCB 1222 receives power from base PCB 1221.

Antenna PCB 1223 comprises a dielectric layer having a planar layer of copper applied to the side of antenna PCB 1223 opposite base PCB 1221. The planar layer of copper serves as the director for the lock unit antenna. Another conductive layer is provided on the opposite side of the dielectric layer to serve as a grounded reflector for the antenna. The side of base PCB 1221 facing antenna PCB 1223 includes a planar copper layer which serves as the driven element for the antenna. Base PCB 1221 is attached to antenna PCB 1223 using standoffs, which separate the driven element from the director by a small gap, e.g. ⅛". The side of base PCB 1221 facing battery bay 1204 includes a layer of grounded copper which serves as a reflector for the antenna and blocks RF signals originating from inside the room from reaching the lock unit antenna. This ensures that only RF signals generated by a universal key located outside of the room are received by lock unit 1200. The driven element and the reflector are coupled in order to reduce the standing wave ratio. This arrangement provides an antenna that is directionally sensitive with a sufficiently high gain, while maintaining a very small form factor.

Figure 13:
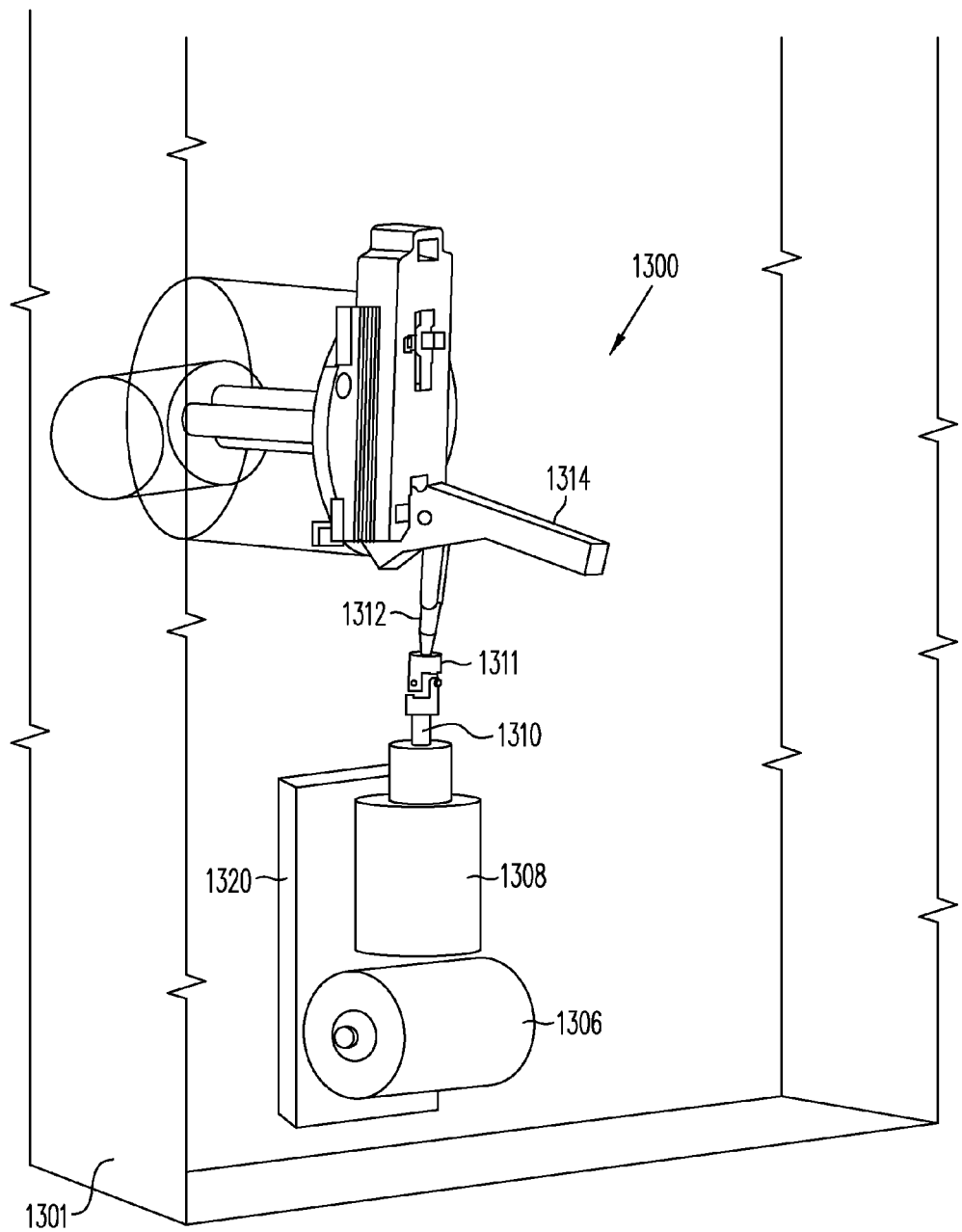
FIG. 13 is a perspective view of a lock unit, in accordance with another embodiment of the present invention.

FIG. 13 is a perspective view of a lock unit 1300 mounted onto a door 1301, in accordance with another embodiment of this invention. In FIG. 13, various portions of lock unit 1300 are not shown or are shown in wireframe for clarity. In contrast with motor-driven lock unit 1200 in FIGS. 12A-12C, lock unit 1300 includes a solenoid 1308 which is powered by a battery 1306. Lock unit reader 1320 controls solenoid 1308 as described above with respect to FIG. 5. When activated by reader 1320, solenoid 1308 drives vertical movement of pin 1310. Pin 1310 is coupled to universal joint 1311, which in turn is coupled to connecting rod 1312, and then to thumb latch 1314. Accordingly, movement of solenoid 1308 causes thumb latch 1314 to move up and down. Thumb latch 1314 is coupled to gearing such that when thumb latch 1314 is raised by either solenoid 1308 or manually by a user, the spindle of the lockset rotates, thereby withdrawing the latch out of the door jamb.

Alternative Embodiments

In other embodiments, a variety of methods may be used to initiate communication between the universal key and the lock unit. For example, another embodiment uses a physical proximity detector to detect when someone enters a prescribed area around the front of the door, similar to the proximity detectors used in many commercial buildings to open doors as customers approach. As a person approaches the door, the proximity detector will instruct the transceiver in the lock unit to transmit an interrogation signal. If a compatible universal key is within range, the universal key will respond to the interrogation signal from the lock unit by transmitting its ID code. This ID code will then be received and processed by the lock unit, as described above.

In accordance with embodiments of the present invention, a compact and lightweight portable unit that can be easily and un-noticeably carried in a shirt pocket, pants pocket or purse provides a hands-free, wireless, lock opening function. In some embodiments, the wireless lock opener is constantly on for the user and unlocks doors or other lock-controlled structures when within a predetermined distance, which may vary from one type of locked structure to the next. The same key unit may be used for all types of locks including, for example, those on a house door, garage door, parking entrance gate, office building lobby, office elevator, main office door and more secure dwelling spaces in an office, such as secured computer server closets and maintenance closets. The key unit will also work to access electronic locks, such as those associated with devices requiring passwords or personal identification numbers (PINs). Unlike conventional garage door openers, the constantly on wireless key does not have an unlock activation button for initiating an unlocking operation at a locked structure. Instead, as the key-carrying user approaches the locked structure, at a predetermined distance from the locked structure, where the distance varies depending on the configuration of the lock on the structure, the lock automatically unlocks.

If the locked structure is the front door of a residential living area, the locking system may be configured to unlock the front door only when the universal key is within a very short range, e.g., 2 to 3 feet. Because the user will be approaching the front door on foot, the approach speed is quite low. Therefore, unlocking the door such a short distance away will not result in undesirable delays for the user. In contrast, if the locked structure is a door to a secured garage, then the user will likely be in an automobile and traveling at a much higher velocity, so it may be desirable for the locking system to be configured to unlock the garage door at a much larger distance. For example, the distance at which unlocking of garage doors occurs can be 50 feet or more. More specifically for garages, the distance at which unlocking is initiated may be set to coincide with the distance at which an approaching car is essentially committed to driving into the garage. This can vary from one location to another. In some instances, the locked structure unlocks at the precisely controlled distance only if the key-carrying user approaches from a particular direction but not from another direction. This is useful for applications such as separate entrance and exit driveways for commercial parking lots among other places.

In one embodiment, the universal key is contained within a water-resistant molded plastic casing that is able to absorb mechanical shock when accidentally dropped, for example, into a wet area where the inside circuitry may otherwise become short circuited. It is also desirable for the key to be able to remain operational over a wide range of temperatures without variance of its radio frequency power output level. Each locked structure has an antenna whose reception range is tuned so that the lock reader will be able to detect pulsed output signals from the universal key only within the desired distance. The universal key transmitter has an antenna that is omni-directional so the same signal strength is provided irrespective of the orientation of the key unit within a user's pocket or elsewhere. On the other hand, some receivers associated with a lock unit may have directional sensitivity for allowing opening from a first distance in one direction and from a substantially different distance or none at all in another direction.

In some embodiments, it may be desirable for the universal key to be temporarily shut off. This may be desirable in cases where the key unit is being taken on an aircraft and government regulations require radio transmitters to be shut off, or in other cases where the user does not want his device to be active, such as because a prowler is nearby or because the user is going away on vacation and wishes to preserve battery life. A switch may be provided on the key to turn the transmission on or off. In some embodiments, the key may be provided with a difficult-to-access slide switch in order to avoid the key from being turned off inadvertently while in the user's pocket, for example.

In some embodiments, it may be desirable to utilize a power source specifically designed for use in RF applications. For example, PulsesPlus™ batteries by Tadiran of Port Washington, New York, are rechargeable lithium-ion type batteries that may be suitable for various embodiments. These batteries are especially designed to provide long battery life in high current pulsed RFID applications. In other embodiments, ordinary alkaline batteries or button cells may be used as well.

Several techniques may be used to further prolong battery life. First, pulsed RF identification code sequences (approximately 48 bits long or longer) may be sent out only once every half second or over a longer space of periodic dead time. The duty cycle for on versus off is approximately 5%, but may vary in other embodiments.

A second method of prolonging battery life provides for detecting when the universal key is essentially motionless and at such times, the pulsed RF outputs are suppressed. A watchdog computer program monitors a motion detector, and if there is no movement detected beyond a specified watchdog cycle, the unit is put into low power sleep mode. Any movement triggers the watchdog program to terminate the sleep mode and resume normal transmission. The amount of motion sufficient to keep the unit active and sending out pinging RF signals may vary in different embodiments. For example, it may be desirable for small vibrations, such as those experienced by a user seated inside a car which is running in idle, to provide sufficient movement so as to maintain the universal key in active transmission mode.

In various embodiments described above, the lock reader comprises a uni-directional transmission scheme in which the universal key serves only as a transmitter and the lock unit serves only as a receiver. In an alternative embodiment, two-way communication is allowed where the always-on and always-carried universal key listens for initial pinging transmissions from nearby lock units. In essence, the lock output pings represent the question: "is any one out there who will respond to my inquires?" The key unit detects these inquires when the key is close enough and then answers back with a signaling sequence that says "yes I am here and here is my unique personal identification code." If the unique personal identification code matches one for which access is allowed at the access gateway, the unlock operation is initiated. With this two-way communication methodology, a third means of prolonging battery life is possible. With this embodiment, the universal key is always in sleep mode until the key travels within range of an interrogation signal from a lock unit transmitter. At that time, the universal key terminates its sleep mode and transmits its ID code. Once out of range of the lock unit transmitter, the universal key returns to sleep mode.

In one embodiment, the lock unit reader searches for a universal key bit sequence including a pseudo random number jitter pattern and a specified bit sequence. The unlocking of the lock unit requires both a matching jitter pattern between bits and the correct bit sequence. In addition, when two-way communication is available, a complex hash algorithm between universal key and receiver can be used as an encryption scheme to ensure that the universal key is genuine and to prevent unauthorized capture of the universal key ID code.

It is expected that in general use, the universal key battery is in sleep mode eight (8) hours a day while the user is asleep. In addition, actual active use initiated by the motion detecting circuitry is about three (3) hours out of a 24 hour day. However, this may vary from user to user depending on the activity of the user.

The always-on and constantly worn universal key has greatest utility for people whose lifestyle requires them to pass through many locked structures during an average day. For example, a computer service technician who must pass through many locked doors to get to a secured computer server closet may have to pass through front security gates of different company facilities, then the garage gates of different garage areas, passing through secured lobby areas that require yet further keying, to an appropriate elevator bank. Next, the technician travels to an appropriate floor in the office building and through an appropriate front office door, followed by passage into more secured areas including the secured computer server closet. Conventionally, such a person would have to carry many mechanical keys, electronic key cards, magnetic key cards, and/or remember various passcodes or PIN numbers. Such a user would have to manually pull the appropriate card as he/she approached each and every secured locked structure. This can be time consuming and problematic, especially if one of the multiple access keys is lost. On the other hand, with the systems described above, a single universal key can be used to operate a plurality or all of the necessary secured access gateways. Each access gateway is programmed with a list of personal identification numbers for persons who are authorized to pass through that gateway, perhaps also indicating the direction of the passage at given times during the day. If the universal key is lost and security is notified, the old ID code can be immediately removed from the system and a new key issued with a completely different identification code, thus allowing the user to access all of the authorized areas.

With the always-on and periodically transmitting key, a company may keep track of where specific key-carrying employees are throughout the day so they can be contacted as required. This may be accomplished, for example, by monitoring the access logs of each individual lock unit, or by placing monitoring units at strategic locations. Each of these monitoring units can continuously monitor the transmitting universal keys that travel within the monitoring unit's range and communicate this information to a central computer. The company can grant users access to as many different locked structures as deemed necessary but can also control time of day and days of the week that are allowed. For example, a company may require a night security guard to check various rooms and pass through secured door areas in a particular sequence and during different time intervals. The universal key allows this to happen without requiring the guard to have many different keys and will allow the company to verify that the guard has indeed come within a certain range of each of the doorways at appropriate times.

Embodiments of an access control system utilizing a universal key can have numerous applications. In some embodiments, the ID code is used as part of a tracking mechanism. For example, in a commercial setting, a timeclock system may incorporate a lock unit having a receiver for receiving RF signals from universal keys possessed by employees who pass within range of the timeclock. This tracking function may be provided in addition to physically unlocking an access gateway (e.g., a door), or may be provided alone without any door unlocking function (e.g., employees exiting an establishment through a particular hallway will have their exit time recorded by a timeclock receiver located in the hallway). This tracking function may also be used in conjunction with an emergency response system. In the event of an emergency, the emergency response system may determine the locations of all employees by detecting their universal key RF signals.

As described above, the lock unit may be used to actuate a lock on a door in response to receiving an authorized ID code. This actuation can be implemented using various mechanisms. In one embodiment, the door lock comprises a lever latch-type door lock that is opened using a solenoid driven by an actuator after receiving an authorized ID code. This lever latch may also include a manual override lever on the inside and/or the outside of the door. In another embodiment, a locking pin is driven via the solenoid into the lever latch after the door is closed and an alignment sensor detects that the lever latch is properly seated. This locking pin may provide the user with the equivalent of dead bolt security with a traditional lever lock system. In yet anther embodiment, the lever latch system may comprise a manual override button, enabling a user to disable the wireless unlocking mechanism and requiring a physical key for entry. This may be desirable, when a user will not be accessing the door for extended periods of time, e.g., when the user goes on vacation. In other embodiments, the lock may comprise a padlock or other mechanical latch.

In other embodiments, a universal key may be used as a user identification mechanism for a payment system. One type of payment system is a meter, such as a parking meter. This parking meter may record when a particular universal key enters and exits a prescribed region, e.g., a parking stall. This can be used to record the parking time for a particular user's car so that a time-based fee may be charged. In some embodiments, this payment mechanism may be incorporated into a parking meter that also includes other payment mechanisms, such as a credit card-based or traditional coin-operated parking meter. In these embodiments, it may be desirable for the parking meter to include an indicator for indicating to a parking enforcement officer that a universal key-based ID code is being charged for the automobile currently parked in the stall. This indicator may comprise, e.g., a flashing light or other display indicating that an RF signal having an ID code is being received.

In another embodiment, the payment system is provided for authorizing payment in exchange for other goods or services. For example, a user may use the universal key to authorize payment at a vending machine, laundromat, or any other equipment that accepts cash, ATM cards, credit cards, or other forms of payment. It may be desirable for the payment system to provide some feedback to the user to indicate that a charge is being placed.

In another embodiment, the receiver may record a user's ID code as a user enters and exits a parking garage, thereby enabling the parking garage to charge the user for the time the user's vehicle was parked in the garage. In some embodiments, the detection of the ID code may be used to open and close a garage door which prevents unauthorized users from entering the garage. In other embodiments, the universal key is only used to record entry and exit times, with no physical barriers (e.g., gate or garage door) being used for the garage. This may be useful, e.g., in public parking garages.

In yet other embodiments, a utility control system may be controlled based on the presence of universal keys in the building. This utility control system may, for example, activate or deactivate the HVAC (Heating, Ventilation, & Air Conditioning) and lighting within a particular room or region of a building based on the presence of a universal key. The utility control system may further customize the utility settings based on the particular universal key. For example, the utility control system may set the thermostat of a room to a particular temperature corresponding to the ID code. The utility control system may further control entertainment systems, such as audio or video systems, based on the ID code (e.g., turning the radio on to a user's favorite channel when the ID code corresponding to that user is detected in the room).

In yet other embodiments, the universal key may be used to control other building facilities, such as water, electricity, or gas flow. In one embodiment, a hands-free sink may turn on the water in response to detecting a universal key within a prescribed distance and to turn the water off once the universal key is no longer detected. This could help to prevent overflow of a sink or bath and could also conserve water. In another embodiment, the universal key can be used to control electricity or gas flow to a cooktop stove. For example, after the stove is turned on, the key carrier must remain within a prescribed distance of the stove, which contains a receiver circuit. If the user moves beyond the specified distance, the electricity or gas flow is ceased. This may help to prevent potential fire hazards caused by individuals forgetting to turn off the stove.

In yet other embodiments, the universal key may be used to activate or deactivate a security alarm in a building. When an authorized ID code is detected, the security alarm may deactivate, and when the ID code is no longer detected, the security alarm may automatically arm.

The universal key can be used to assist in providing a facility designed to accommodate the requirements of the Americans with Disabilities Act. Currently, many buildings are equipped with buttons that activate motors for opening doors. In accordance with one embodiment, an ADA-compliant door may be equipped with a lock reader configured to open the door automatically in response to detecting the presence of a universal key.

The described universal key system may be implemented in various embodiments as a method or apparatus using standard programming and/or engineering techniques to produce software, firmware, hardware, or any combination thereof. The apparatus may comprise code or logic implemented in hardware (e.g., an integrated circuit chip, Programmable Gate Array (PGA), Application Specific Integrated Circuit (ASIC), etc.) or a computer readable medium, for example, magnetic storage medium (e.g. hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. Of course, those skilled in the art will recognize that many modifications may be made to this configuration without departing from the scope of the implementations.

While the invention has been described in terms of particular embodiments and illustrative figures, those of ordinary skill in the art will recognize that the invention is not limited to the embodiments or figures described. For example, various embodiments described above relate to the use of a lock unit to actuate a lock on a door, gate, or garage upon receipt of an authorized ID code. In other embodiments, the universal key may be used to provide access to any type of secured portal, physical or electronic. A lock unit on a secured portal may be used to actuate any mechanism, e.g., electrical, mechanical, pneumatic, magnetic, or optical devices.

In addition, many of the embodiments described above comprise doors that provide one-way access control, i.e., an authorized ID code is needed to pass through the door in one direction, but no key or code is required to pass through in the other direction. This arrangement is particularly suitable for home security, where it is only desirable to prevent entry, not exit. In other embodiments, the access control system may provide bi-directional access control. In other words, it may be desirable to require that a user possess a universal key having an authorized ID code to pass through a door or other gateway in either direction. It may still be desirable to have a manual override (e.g., a mechanical key insertable into a tumbler lock) on one or both sides of the gateway.

In addition, a receiver or transmitter is described as a component of the various devices described herein. It will be understood that in some implementations, the receiver and transmitter may be provided as separate components, while in other implementations, the receiver and transmitter functions may be provided by a single transceiver component.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. While certain embodiments of this invention have been described above, other embodiments will be obvious in view of this description. This invention shall only be limited by the claims and not by the above description.

What is claimed is:

1. An access control system, comprising:
   a key unit comprising an antenna and a transmitter configured to transmit a radio frequency (RF) signal over the antenna, the RF signal containing an identification (ID) code identifying the key unit;
   a plurality of lock units, each lock unit comprising:
      an antenna for receiving the RF signal from the key unit; and
      a reader coupled to the antenna for receiving the RF signal from the key unit, identifying the ID code contained in the RF signal, comparing the received ID code with a list of one or more authorized ID codes, and if the received ID code is included in the list of authorized ID codes, granting access to a secured resource;
      a first printed circuit board (PCB) having a reflector provided on a first side and a driven element provided on a second side opposite the first side; and
      a second PCB positioned adjacent to the first PCB between the first PCB and the direction from which the secured resource is capable of being accessed by the key unit and having a planar conductive layer (i.e. a "director") provided on the side of the second PCB accessible by the key unit;
   wherein at least one of the lock units is configured to respond to RF signals in a directionally preferential basis;
   wherein the lock unit configured to respond to RF signals in the directionally preferred basis comprises an RF signal shield positioned on one side of the antenna; and wherein a first lock unit has a first activation range and a second lock unit has a second activation range different from the first activation range.

2. The access control system of claim 1, wherein each lock unit is adapted to receive the RF signal from the key unit without line-of-sight access.

3. The access control system of claim 1, wherein each lock unit has an activation range for receiving the RF signal greater than 10 cm.

4. The access control system of claim 1, wherein the first lock unit provides access to a first type of portal and the second lock unit provides access to a second type of portal different from the first type of portal.

5. The access control system of claim 1, wherein each lock unit is adapted to receive the RF signal from the key unit with line-of-sight access.

6. The access control system of claim 1, wherein said granting access to the secured resource comprises instructing an actuator to unlock a mechanical locking mechanism.

7. The access control system of claim 6, wherein said mechanical locking mechanism comprises a dead bolt, a lever latch, or a padlock.

8. The access control system of claim 6, wherein said mechanical locking mechanism comprises a lock on a physical portal.

9. The access control system of claim 8, wherein at least one of the lock units further comprises an alignment sensor and the reader is configured to automatically close the lock on the portal after the alignment sensor senses that the portal has been closed and the key unit is beyond activation range.

10. The access control system of claim 8, wherein said mechanical locking mechanism enables manual unlocking of the mechanical locking mechanism from the interior side of the portal.

11. The access control system of claim 8, wherein said mechanical locking mechanism unlocks the lock unit after receipt of an authorized ID code from the key unit positioned on an exterior side of the portal.

12. The access control system of claim 8, wherein said mechanical locking mechanism comprises a lever latch and a locking pin for locking the lever latch, said locking pin being actuated by a solenoid after the portal is closed and an alignment sensor indicates that the lever latch is properly seated.

13. The access control system of claim 8, wherein said mechanical locking mechanism comprises an override button for disabling the reader.

14. The access control system of claim 8, wherein said mechanical locking mechanism comprises a keyhole for receiving a physical key to unlock the lock unit.

15. The access control system of claim 1, wherein the antenna of the key unit has a meandering shape.

16. The access control system of claim 1, wherein said granting access to the secured resource comprises granting access to an electronic system.

17. The access control system of claim 1, wherein said key unit transmits the ID code on a periodic basis.

18. The access control system of claim 1, wherein said key unit comprises a motion detector, said key unit having a sleep mode during which the key unit does not transmit the ID code and an active mode during which the key unit transmits the ID code on a periodic basis, wherein the key unit enters the sleep mode when no motion is detected for a predetermined period of time and the key unit enters the active mode when motion is detected.

19. The access control system of claim 1, wherein the key unit further comprises an on/off switch.

20. The access control system of claim 1, wherein the key unit further comprises a battery and a visual or audible battery indicator for indicating a status of the battery.

21. The access control system of claim 1, wherein said key unit further comprises a battery and an on/off switch, said on/off switch configured to disengage the battery when in an off state and connect the battery when in an on state.

22. The access control system of claim 21, wherein the on/off switch comprises a rotatable battery compartment cover such that the on/off switch is in the off state when the battery compartment cover is partially rotated and is in the on state when the battery compartment cover is fully rotated.

23. The access control system of claim 1, wherein the key unit further comprises a battery and an on/off switch, said on/off switch comprising a reed-relay and a positionable magnet.

24. The access control system of claim 1, wherein said key unit comprises:
a primary battery for powering the transmitter to transmit the RF signal; and
a secondary battery for powering an alarm configured to activate when the primary battery reaches a predetermined minimum charge.

25. The access control system of claim 1, wherein said key unit is enclosed within a metal housing, and wherein said antenna is provided on an exterior of the metal housing.

26. The access control system of claim 1, wherein the key unit further comprises a receiver and at least one of the lock units includes a reader having a transmitter.

27. The access control system of claim 26, wherein the transmitter is configured to encrypt the ID code in the transmitted RF signal.

28. The access control system of claim 26, wherein:
at least one of the lock units is configured to transmit an interrogation signal; and
the key unit has a sleep mode during which the key unit does not transmit the ID code and an active mode during which the key unit transmits the ID code on a periodic basis, wherein the key unit enters the active mode upon receipt of the interrogation signal.

29. The access control system of claim 1, wherein at least one of the lock units is configured to respond to RF signals in a directionally preferential basis and further at least one of the lock units is configured to only open in response to RF signals received from a first side of a door.

30. The access control system of claim 29, wherein at least one of the lock units comprises a first antenna provided on a first side and a second antenna on a second side and is configured to compare a signal strength received by the first antenna with a signal strength received by the second antenna to determine the location of the key unit.

31. The access control system of claim 1, wherein at least one of the lock units is configured to only respond to RF signals when the key unit is a predetermined distance from the lock unit.

32. The access control system of claim 1, wherein the reader further comprises a programmable microcontroller.

33. The access control system of claim 32, wherein the reader further comprises a communications interface coupled to the microcontroller.

34. The access control system of claim 33, wherein the microcontroller is configured to receive updates to the list of authorized ID codes via the communications interface.

35. The access control system of claim 33, wherein the communications interface comprises a modem, a network port, or a wireless communications adapter.

36. The access control system of claim 33, wherein the communications interface comprises a wireless communications adapter compliant with IEEE 802.11, IEEE 802.16, or Bluetooth.

37. The access control system of claim 1, wherein the reader is configured to grant access to the secured resource if the received ID code is included in the list of authorized ID codes during a predetermined access time period.

38. The access control system of claim 1, wherein the reader of at least one of the lock units is configured to grant access to the secured resource only if a plurality of authorized ID codes are simultaneously received.

39. The access control system of claim 1, wherein at least one of the lock units further comprises a memory, wherein the reader is configured to store information regarding ID codes received from key units in the memory.

40. The access control system of claim 39, wherein at least one of the lock units is provided in an automobile parking garage and the reader is configured to store information regarding time of entry and exit of each key unit into the automobile parking garage.

41. The access control system of claim 1, further comprising a meter comprising:
   a meter antenna; and
   a meter reader coupled to the meter antenna for receiving the RF signal from the key unit and for storing information regarding a length of time the key unit is within operational range of the meter.

42. The access control system of claim 41, wherein the meter further comprises an indicator for indicating that the RF signal is being received from the key unit.

43. The access control system of claim 1, further comprising:
   a business machine coupled to one of the plurality of lock units, wherein said granting access to the secured resource comprises granting operational access to the business machine.

44. The access control system of claim 1, further comprising:
   an elevator controller coupled to one of the plurality of lock units, wherein said granting access to the secured resource comprises calling an elevator to a location of the received ID code.

45. The access control system of claim 44, further comprising:
   wherein the lock unit coupled to the elevator controller further comprises a memory for storing default floor preferences corresponding to each ID code, wherein the lock unit is configured to transmit a destination floor to the elevator controller based on the ID code.

46. The access control system of claim 1, further comprising:
   a building utility control system coupled to one of the lock units positioned in a room, wherein the building utility control system deactivates a utility service in the room when an ID code is not being received by the lock unit.

47. The access control system of claim 1, further comprising an alarm system coupled to one of the lock units, the alarm system configured to deactivate when an authorized ID code is received or activate when an authorized ID code is not being received.

48. The access control system of claim 1, further comprising a payment system coupled to one of the lock units, the payment system configured to record an ID code as payment for a service or product.

49. The access control system of claim 1, further comprising a water valve control system coupled to one of the lock units, the water valve control system being configured to shut off a water valve if an authorized key unit is not detected within a predetermined range.

50. The access control system of claim 1, further comprising a kitchen appliance control system coupled to one of the lock units, the kitchen appliance control system being configured to deactivate a kitchen appliance if an authorized key unit is not detected within a predetermined range.

51. The access control system of claim 1, further comprising an automation control system coupled to one of the lock units, the automation control system being configured to activate one or more devices to a predetermined setting based on the received ID code.

52. The access control system of claim 51, wherein the one or more devices comprise a light, an HVAC system, a video device, or an audio device.

53. The access control system of claim 1, wherein said key unit is hands-free and transmits the RF signal omnidirectionally.

54. The access control system of claim 1, wherein said key unit comprises a water-resistant and shock-resistant key fob.

55. The access control system of claim 1, wherein said reader is configured to provide an audible or visible indication that the lock unit has locked.

56. The access control system of claim 1, further comprising a plurality of tracking readers configured to monitor key units that pass within an operational range of the tracking reader.

57. The access control system of claim 56, wherein the tracking readers are connected to a timeclock system that records when an employee passes through a location.

58. The access control system of claim 56, wherein the access control system is part of an emergency response system which can determine the locations of all employees by detecting their universal key RF signals.

59. The access control system of claim 1, wherein at least one of the plurality of lock units is provided in an automobile.

* * * * *